(12) United States Patent
Jimichi et al.

(10) Patent No.: US 10,153,711 B2
(45) Date of Patent: Dec. 11, 2018

(54) ELECTRIC POWER CONVERSION DEVICE

(71) Applicant: Mitsubishi Electric Corporation, Chiyoda-ku (JP)

(72) Inventors: Takushi Jimichi, Chiyoda-ku (JP); Kimiyuki Koyanagi, Chiyoda-ku (JP); Takeshi Kikuchi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/561,660

(22) PCT Filed: Mar. 29, 2016

(86) PCT No.: PCT/JP2016/060125
§ 371 (c)(1),
(2) Date: Sep. 26, 2017

(87) PCT Pub. No.: WO2016/167114
PCT Pub. Date: Oct. 20, 2016

(65) Prior Publication Data
US 2018/0076734 A1    Mar. 15, 2018

(30) Foreign Application Priority Data
Apr. 13, 2015 (JP) .................. 2015-081392

(51) Int. Cl.
*H02M 7/483* (2007.01)
*H02M 7/49* (2007.01)
(Continued)

(52) U.S. Cl.
CPC .......... *H02M 7/483* (2013.01); *H02M 7/003* (2013.01); *H02M 7/2173* (2013.01);
(Continued)

(58) Field of Classification Search
CPC ............ H02M 7/06; H02M 7/08; H02M 7/12; H02M 7/42; H02M 2007/4835;
(Continued)

(56) References Cited

U.S. PATENT DOCUMENTS

2011/0096580 A1*  4/2011  Asplund .................. H02J 3/36
                                                    363/132
2012/0195084 A1*  8/2012  Norrga .................. H02M 7/483
                                                    363/127
(Continued)

FOREIGN PATENT DOCUMENTS

WO       2011/012174 A1      2/2011
WO    WO 2014111595 A1 *     7/2014  .............. H02M 1/32
WO    WO 2015110185 A1 *     7/2015  .............. H02M 1/32

OTHER PUBLICATIONS

Hagiwara, Makoto, et al. "*PWM Control and Experiment of Modular Multilevel Converters*", IEEJ Trans. IA, vol. 128, No. 7, (2008), 10 pages (with English Abstract and partial English Translation).
(Continued)

*Primary Examiner* — Timothy J Dole
*Assistant Examiner* — Ivan Laboy Andino
(74) *Attorney, Agent, or Firm* — Oblon, McClelland, Maier & Neustadt, L.L.P.

(57) ABSTRACT

In an electric power conversion device which performs power conversion between multiphase AC and DC, a first converter cell of a first arm for each phase of a power converter includes: a capacitor; a Leg A having upper and lower arms having switching elements; and a Leg B having upper and lower arms one of which has a switching element and the other of which has only a diode, and a second converter cell of a second arm includes: a capacitor; and a Leg Aa having upper and lower arms having switching elements. A control device has a steady mode and a protection mode. When short-circuit between DC terminals of the
(Continued)

power converter is detected, the control device switches from the steady mode to the protection mode, turns off all the switching elements of the first converter cell of the first arm, and controls the second converter cell of the second arm so as to perform reactive power compensation operation.

18 Claims, 26 Drawing Sheets

(51) Int. Cl.
    *H02M 7/497*      (2007.01)
    *H02M 7/5387*      (2007.01)
    *H02M 7/00*      (2006.01)
    *H02M 7/217*      (2006.01)
    *H02M 7/5388*      (2007.01)
    *H02M 1/00*      (2006.01)

(52) U.S. Cl.
    CPC .. *H02M 7/5388* (2013.01); *H02M 2001/0003* (2013.01); *H02M 2007/4835* (2013.01)

(58) Field of Classification Search
    CPC ............. H02M 1/32; H02M 2001/322; H02M 2001/325; H02M 7/493; H02M 7/217; H02M 7/219; H02M 7/797; H02M 7/44; H02M 7/48; H02M 7/483; H02M 7/487; H02M 7/49; H02M 7/537; H02M 7/5387; H02M 7/5388; H02J 3/36; H02H 9/041; H02H 9/043; H02H 7/1227; H02H 7/1257

See application file for complete search history.

(56) References Cited

U.S. PATENT DOCUMENTS

| | | | |
|---|---|---|---|
| 2015/0340859 A1* | 11/2015 | Barker | H02H 3/07 361/62 |
| 2016/0072267 A1* | 3/2016 | Fu | H02G 7/16 219/488 |
| 2016/0126827 A1* | 5/2016 | Dong | H02M 1/32 363/50 |
| 2017/0070047 A1* | 3/2017 | Shen | H02J 3/36 |
| 2017/0163170 A1* | 6/2017 | Tahata | H02M 7/155 |

OTHER PUBLICATIONS

Shibano, Yuji, et al. "A Phase-Shifted PWM Statcom Using the Modular Multilevel Cascade Converter", IEEJ Trans. IA, vol. 133, No. 9, (2013), 8 pages (with English Abstract and partial English Translation).

International Search Report dated Jun. 21, 2016 in PCT/JP2016/060125, filed on Mar. 29, 2016.

* cited by examiner

FIG. 3

| | SWITCHING STATE | | | OPERATION MODE |
|---|---|---|---|---|
| | 21s | 22s | 24s | |
| MODE 1 | ON | OFF | ON | VOLTAGE BETWEEN BOTH ENDS OF CAPACITOR IS OUTPUTTED |
| MODE 2 | OFF | ON | ON | ZERO VOLTAGE IS OUTPUTTED |
| MODE 3 | OFF | OFF | OFF | PROTECTION MODE |

FIG. 5

| | SWITCHING STATE | | | OPERATION MODE |
|---|---|---|---|---|
| | 31s | 33s | 34s | |
| MODE 1 | ON | OFF | ON | VOLTAGE BETWEEN BOTH ENDS OF CAPACITOR IS OUTPUTTED |
| MODE 2 | ON | ON | OFF | ZERO VOLTAGE IS OUTPUTTED |
| MODE 3 | OFF | OFF | OFF | PROTECTION MODE |

FIG. 6
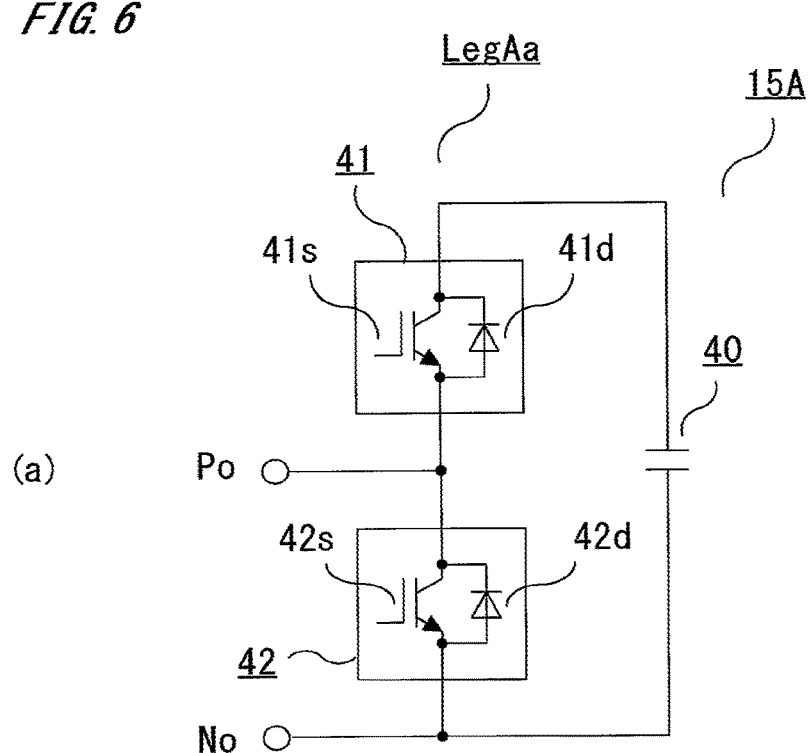
(a)
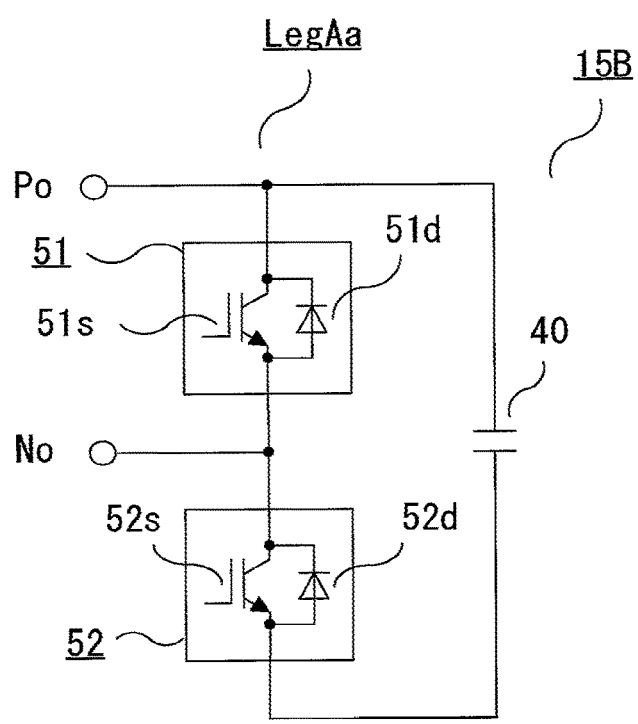
(b)

FIG. 7

| SWITCHING STATE | | OPERATION MODE |
|---|---|---|
| 41s, 52s | 42s, 51s | |
| MODE 1 | ON | OFF | VOLTAGE BETWEEN BOTH ENDS OF CAPACITOR IS OUTPUTTED |
| MODE 2 | OFF | ON | ZERO VOLTAGE IS OUTPUTTED |

FIG. 10
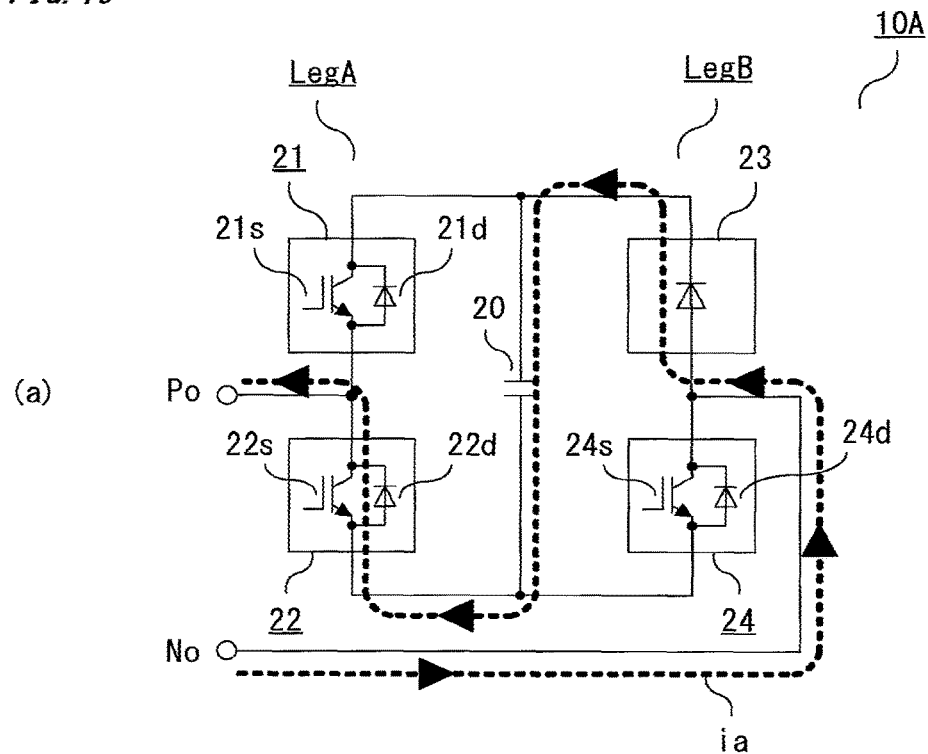
(a)
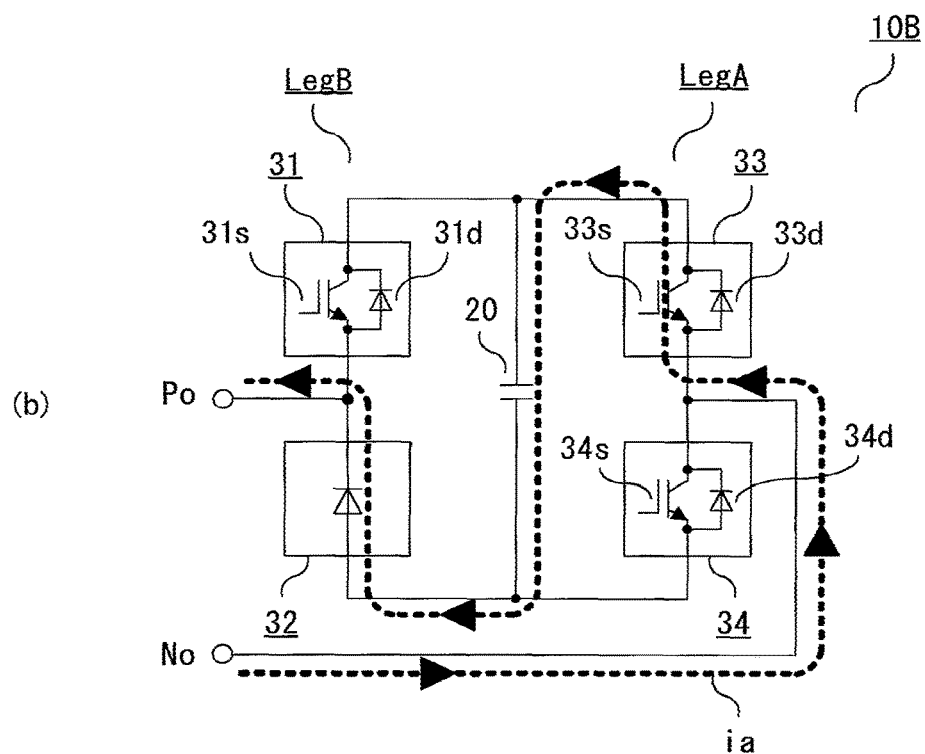
(b)

FIG. 24
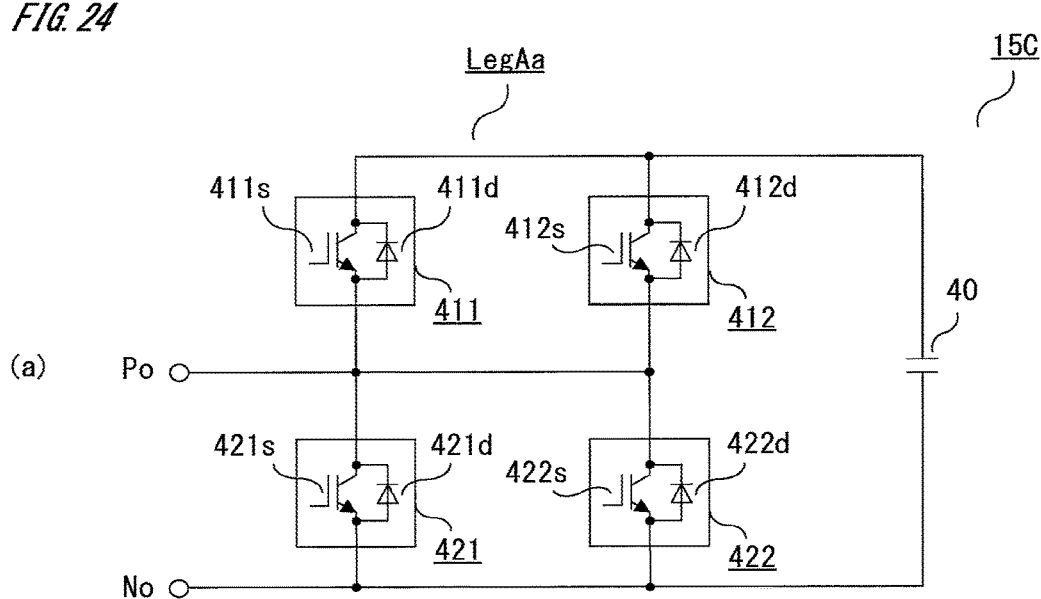
(a)
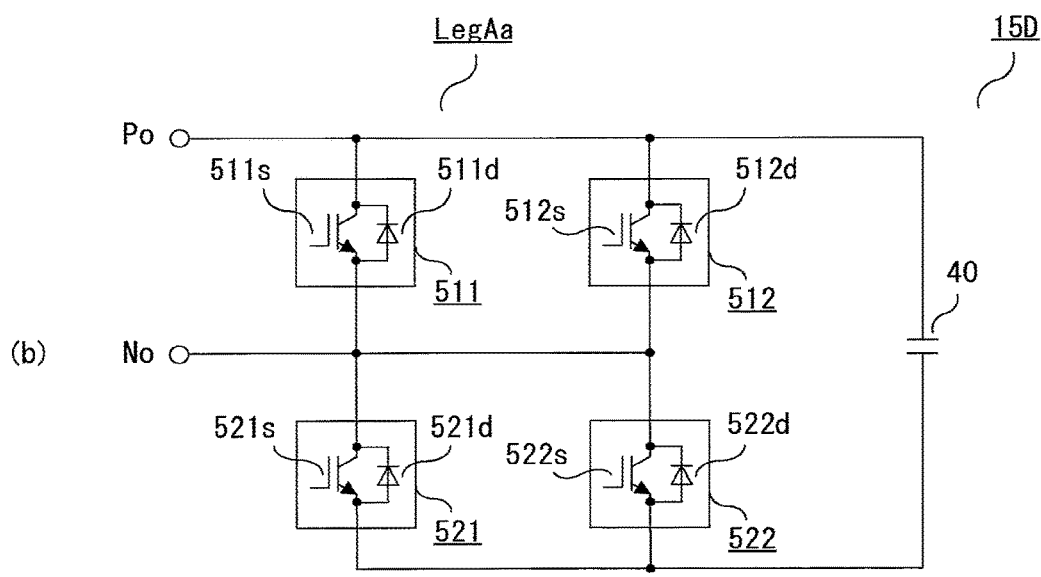
(b)

ELECTRIC POWER CONVERSION DEVICE

TECHNICAL FIELD

The present invention relates to an electric power conversion device which performs power conversion between multiphase AC and DC, and in particular, relates to a large-capacity electric power conversion device with multiplexed converters.

BACKGROUND ART

In large-capacity electric power conversion devices, the converter output is high voltage or large current, and therefore, many large-capacity electric power conversion devices are configured with a plurality of converters multiplexed in series or parallel. Multiplexing converters enables not only increase in the converter capacity, but also reduction in harmonics contained in an output voltage waveform by synthesizing outputs, and as a result, harmonic current flowing to a grid can be reduced.

As means for multiplexing converters, there is known a modular multilevel converter in which outputs of a plurality of converters are connected in cascade. Each arm of the modular multilevel converter is composed of a plurality of converter cells connected in cascade.

In a conventional modular multilevel converter, each of a first arm and a second arm for each phase, which are provided between an AC terminal for each phase and positive and negative DC terminals, has a chopper cell (converter cell) and a reactor. The chopper cell has two semiconductor switches connected in series to each other, and a DC capacitor connected in parallel thereto. In each of the first arm and the second arm, the same number of chopper cells are connected in series via their respective output ends. Using voltage commands for the first arm and the second arm, semiconductor switching elements in the chopper cells in the first arm and the second arm are ON/OFF controlled, thereby generating AC voltage at the AC terminal and DC voltage at the DC terminals (for example, Non-Patent Document 1).

Another modular multilevel converter is disclosed which uses a multilevel circuit in which a converter cell has semiconductor switching elements in a full-bridge form, for the purpose of suppressing short-circuit current that occurs when DC terminals P, N are short-circuited (for example, Patent Document 1).

Further, a Static Synchronous Compensator (STATCOM) is proposed which performs reactive power compensation using a modular multilevel converter of star-connection type in which AC sides of converter cells are connected in series for each phase (for example, Non-Patent Document 2).

CITATION LIST

Patent Document

Patent Document 1: International Publication No. 2011/012174

Non-Patent Document

Non-Patent Document 1: Makoto Hagiwara, Hirofumi Akagi, "PWM Control and Experiment of Modular Multilevel Converters (MMC)", IEEJ transactions D, vol. 128, no. 7, 2008 (pp. 957-965)

Non-Patent Document 2: Yuji Shibano, Joao I. Yutaka Ota, Naoto Niimura, Hirofumi Akagi, "A Phase-Shifted PWM STATCOM Using the Modular Multilevel Cascade Converter (MMCC-SSBC)", IEEJ transactions D, vol. 133, no. 9, 2013 (pp. 928-935)

SUMMARY OF THE INVENTION

Problems to be Solved by the Invention

In a conventional electric power conversion device that performs power conversion between multiphase AC and DC using the modular multilevel converter shown in Non-Patent Document 1, excessive short-circuit current flows when a DC short-circuit fault occurs, and thus elements in the converter might be deteriorated.

In the case of using the modular multilevel converter shown in Patent Document 1, short-circuit current can be suppressed when a DC short-circuit fault occurs. However, since each converter cell is configured by a full-bridge circuit, the number of semiconductor switching elements increases, and thus the size of the device configuration becomes large. In addition, while short-circuit current is being suppressed when a DC short-circuit fault has occurred, voltage control on the AC side cannot be performed, and in the case where the modular multilevel converter is connected to an AC grid, the AC grid is adversely influenced.

In a conventional electric power conversion device using the modular multilevel converter shown in Non-Patent Document 2, reactive power is outputted to the AC side, to suppress voltage variation and stability decrease in the AC grid, but this cannot be used for power conversion between multiphase AC and DC.

The present invention has been made to solve the above problems, and an object of the present invention is to provide, at low cost, a small-sized electric power conversion device that is capable of large-capacity power conversion between multiphase AC and DC, and that can suppress short-circuit current when DC terminals are short-circuited, and prevents the AC side from being adversely influenced even when the DC terminals are short-circuited.

Solution to the Problems

An electric power conversion device according to the present invention includes: a power converter including a plurality of leg circuits connected in parallel between positive and negative DC terminals, each leg circuit including a first arm and a second arm connected in series and a connection point therebetween being connected to an AC terminal for each phase, the first arm and the second arm each being composed of one or a plurality of converter cells connected in series, each converter cell including an energy storing element and a first bridge having upper and lower arms both having semiconductor switching elements, the power converter performing power conversion between multiphase AC and DC; and a control device for generating respective voltage commands for the first arm and the second arm of each leg circuit, to perform output control of each converter cell in the first arm and the second arm, thereby controlling the power converter. The one or plurality of converter cells in the first arm of each leg circuit of the power converter include a first converter cell having a full-bridge configuration including the energy storing element, the first bridge, and a second bridge having upper and lower arms one of which has a semiconductor switching element and the other of which has only a diode. The one or plurality of converter cells in the second arm of each leg circuit of the power converter include a second converter cell having a half-bridge configuration including the energy storing element and the first bridge. The control device has two control modes of a steady mode and a protection mode. When short-circuit between the DC terminals is detected, the control device switches from the steady mode to the protection mode, to turn off all the semiconductor switching elements in each converter cell of the first arm of each leg circuit, and perform output control of each converter cell of the second arm of each leg circuit so as to perform reactive power compensation operation.

Effect of the Invention

The electric power conversion device of the present invention is capable of large-capacity power conversion between multiphase AC and DC, has a device configuration reduced in size and cost, and can suppress short-circuit current when the DC terminals are short-circuited. In addition, since reactive power compensation is performed on the AC side also when the DC terminals are short-circuited, it is possible to continue operation with high reliability without adversely influencing the AC side.

BRIEF DESCRIPTION OF THE DRAWINGS

FIG. 3 is a diagram illustrating operation of the first converter cell according to embodiment 1 of the present invention.

FIG. 5 is a diagram illustrating operation of the first converter cell in another example of embodiment 1 of the present invention.

FIG. 6 is a circuit diagram showing the configuration of a second converter cell according to embodiment 1 of the present invention.

FIG. 7 is a diagram illustrating operation of the second converter cell according to embodiment 1 of the present invention.

FIG. 10 is a diagram illustrating a route of short-circuit current flowing through the first converter cell according to embodiment 1 of the present invention.

FIG. 24 is a circuit diagram showing the configuration of a second converter cell according to embodiment 4 of the present invention.

DESCRIPTION OF EMBODIMENTS

Embodiment 1

Figure 1:
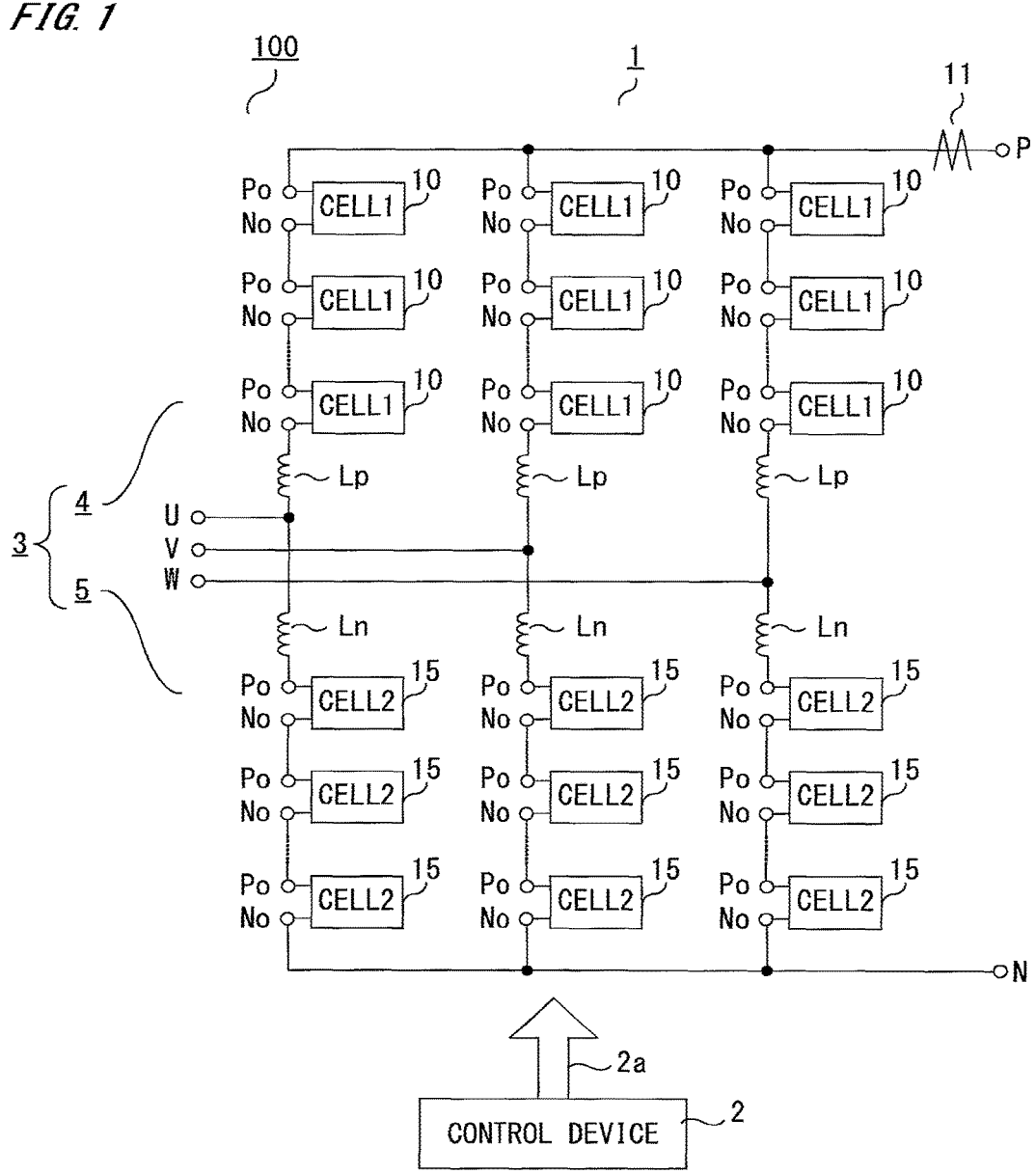
FIG. 1 is a schematic configuration diagram of an electric power conversion device according to embodiment 1 of the present invention.

Hereinafter, an electric power conversion device according to embodiment 1 of the present invention will be described with reference to the drawings. FIG. 1 is a schematic configuration diagram of the electric power conversion device according to embodiment 1 of the present invention.

As shown in FIG. 1, the electric power conversion device 100 includes a power converter 1 which is a main circuit, and a control device 2 for controlling the power converter 1. The power converter 1 performs power conversion between multiphase AC (in this case, three phases) and DC, and has AC terminals U, V, W and DC terminals P, N.

Each phase of the power converter 1 is formed by a leg circuit 3 in which a first arm 4 between each AC terminal U, V, W and a positive DC terminal P, and a second arm 5 between each AC terminal U, V, W and a negative DC terminal N, are connected in series, and the connection point therebetween is connected to an AC line for each phase. The three leg circuits 3 are connected in parallel between the positive and negative DC terminals P, N.

The first arm 4 of each leg circuit 3 has a converter cell group including a plurality of first converter cells 10 having full-bridge configurations and connected in series. The second arm 5 of each leg circuit 3 has a converter cell group including a plurality of second converter cells 15 having half-bridge configurations and connected in series. It is noted that each of the number of the first converter cells 10 in the first arm 4 and the number of the second converter cells 15 in the second arm 5 may be only one. In this case, the first arm 4 has only the first converter cell 10 as a converter cell, and the second arm 5 has only the second converter cell 15 as a converter cell.

Thus, the first and second arms 4, 5 respectively have a converter cell group including one or more first converter cells 10 connected in series, and a converter cell group including one or more second converter cells 15 connected in series, and a positive-side reactor Lp and a negative-side reactor Ln are respectively interposed in series therein. In addition, a current detector 11 is provided on the DC terminal P side of the power converter 1.

The control device 2 generates voltage commands for the first arm 4 and the second arm 5 of each leg circuit 3 and outputs a control signal 2a for performing output control of each of the first converter cells 10 and the second converter cells 15 in the first arm 4 and the second arm 5, thereby controlling the power converter 1.

Two kinds of configurations (first converter cells 10A, 10B) of the first converter cell 10 will be described below.

Figure 2:
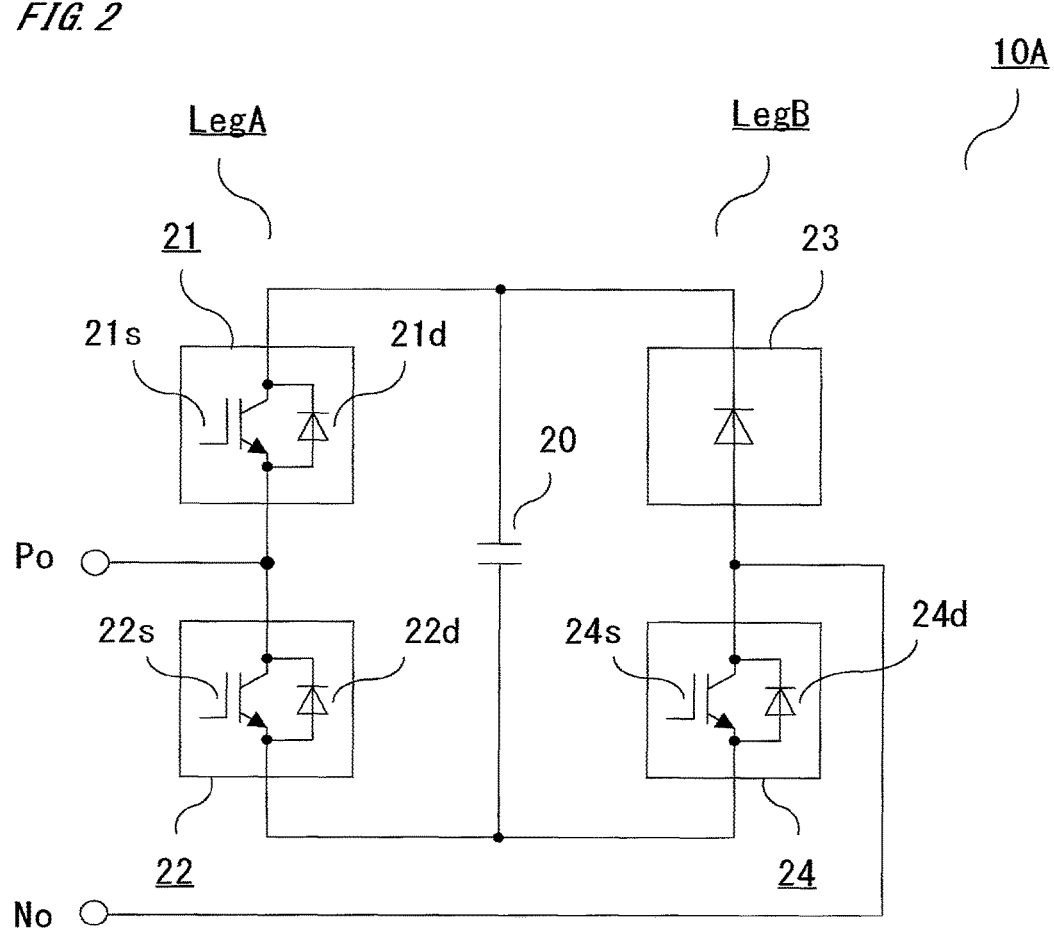
FIG. 2 is a circuit diagram showing the configuration of a first converter cell according to embodiment 1 of the present invention.

FIG. 2 is a circuit diagram showing the configuration of the first converter cell 10A, and FIG. 3 is a diagram illustrating operation of the first converter cell 10A.

As shown in FIG. 2, the first converter cell 10A includes: a Leg A which is a first bridge having upper and lower arms both formed by semiconductor switches 21, 22; a Leg B which is a second bridge having an upper arm formed by only a diode 23 and a lower arm formed by a semiconductor switch 24; and a capacitor 20 as an energy storing element, and forms a full-bridge circuit in which the Leg A and the Leg B are connected in parallel to the capacitor 20. A positive cell output terminal Po is connected to a connection point between the semiconductor switches 21, 22, which is the middle point in the Leg A, and a negative cell output terminal No is connected to a connection point between the diode 23 and the semiconductor switch 24, which is the middle point in the Leg B.

It is noted that the semiconductor switches 21, 22, 24 are respectively composed of semiconductor switching elements 21s, 22s, 24s and flyback diodes 21d, 22d, 24d connected in antiparallel thereto. As the semiconductor switching elements 21s, 22s, 24s, self-turn-off semiconductor switching elements such as IGBT (Insulated-Gate Bipolar Transistor), GCT (Gate Commutated Turn-off thyristor), or MOSFET (Metal-Oxide-Semiconductor Field-Effect Transistor) are used.

If diodes (body diodes) are included in the semiconductor switching elements 21s, 22s, 24s, the flyback diodes 21d, 22d, 24d may be omitted.

Next, a switching state and an operation mode of the first converter cell 10A will be described with reference to FIG. 3.

When the semiconductor switching elements 21s, 24s are ON and the semiconductor switching element 22s is OFF, voltage between both ends of the capacitor 20 is outputted between the output terminals of the first converter cell 10A (mode 1). When the semiconductor switching element 21s is OFF and the semiconductor switching elements 22s, 24s are ON, zero voltage is outputted (mode 2).

When all the semiconductor switching elements 21s, 22s, 24s are OFF, the operation mode becomes a protection mode and the first converter cell 10A operates as a diode rectifier (mode 3).

Figure 4:
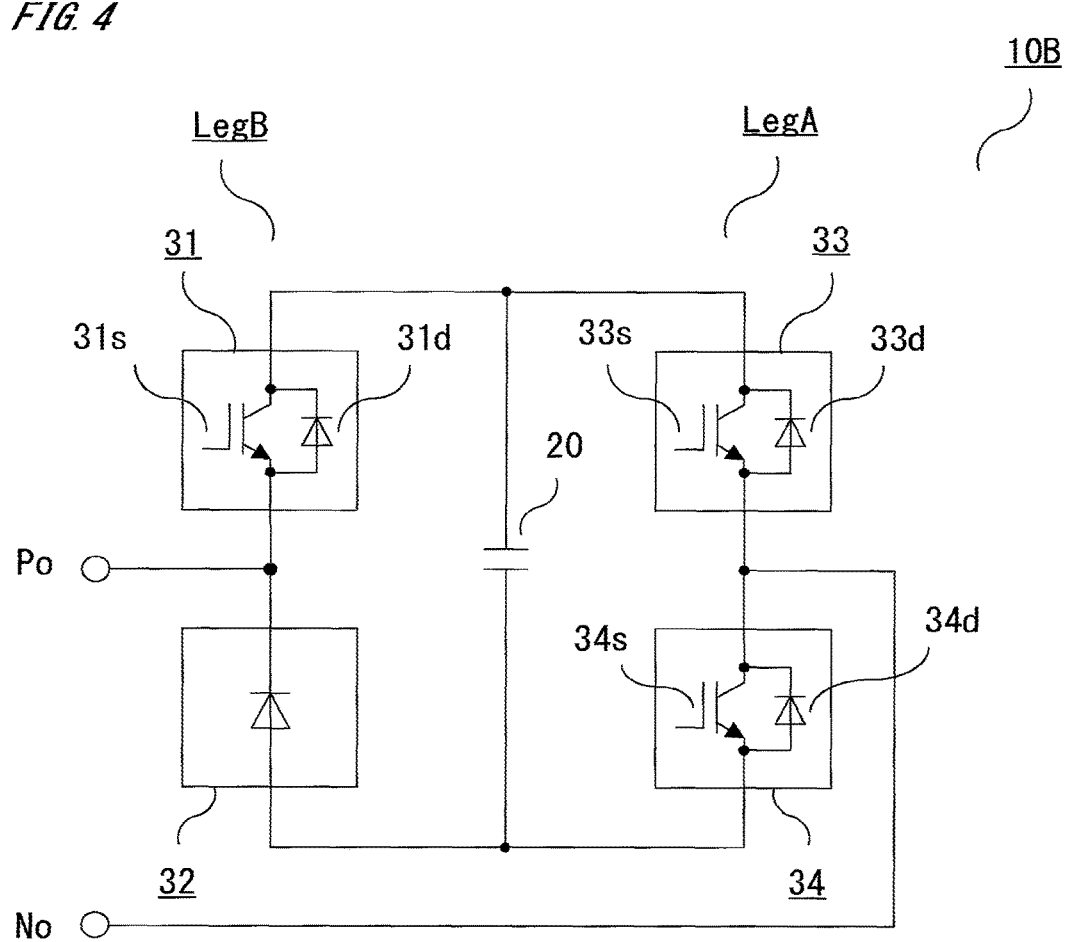
FIG. 4 is a circuit diagram showing the configuration of a first converter cell in another example of embodiment 1 of the present invention.

FIG. 4 is a circuit diagram showing the configuration of the first converter cell 10B, and FIG. 5 is a diagram illustrating operation of the first converter cell 10B.

As shown in FIG. 4, the first converter cell 10B includes: a Leg A which is a first bridge having upper and lower arms both formed by semiconductor switches 33, 34; a Leg B which is a second bridge having an upper arm formed by a semiconductor switch 31 and a lower arm formed by only a diode 32; and a capacitor 20, and forms a full-bridge circuit in which the Leg A and the Leg B are connected in parallel to the capacitor 20. A negative cell output terminal No is connected to a connection point between the semiconductor switches 33, 34, which is the middle point in the Leg A, and a positive cell output terminal Po is connected to a connection point between the semiconductor switch 31 and the diode 32, which is the middle point in the Leg B.

It is noted that the semiconductor switches 31, 33, 34 are respectively composed of semiconductor switching elements 31s, 33s, 34s and flyback diodes 31d, 33d, 34d connected in antiparallel thereto. As the semiconductor switching elements 31s, 33s, 34s, self-turn-off semiconductor switching elements such as IGBT, GCT, or MOSFET are used. If diodes (body diodes) are included in the semiconductor switching elements 31s, 33s, 34s, the flyback diodes 31d, 33d, 34d may be omitted.

Next, a switching state and an operation mode of the first converter cell 10B will be described with reference to FIG. 5.

When the semiconductor switching elements 31s, 34s are ON and the semiconductor switching element 33s is OFF, voltage between both ends of the capacitor 20 is outputted between the output terminals of the first converter cell 10B (mode 1). When the semiconductor switching element 34s is OFF and the semiconductor switching elements 31s, 33s are ON, zero voltage is outputted (mode 2).

When all the semiconductor switching elements 31s, 33s, 34s are OFF, the operation mode becomes a protection mode and the first converter cell 10B operates as a diode rectifier (mode 3).

The control device 2 controls the power converter 1 by two kinds of control modes, i.e., a steady mode and a protection mode.

In the steady mode, the first converter cell 10A (10B) is controlled by the mode 1 and the mode 2, the semiconductor switching elements 21s, 22s (33s, 34s) of the Leg A are subjected to switching control on the basis of generated voltage commands, and the semiconductor switching element 24s (31s) of the Leg B is fixed in an ON state. It is noted that a short-circuit preventing period called a dead time may be provided at the time of switching between the mode 1 and the mode 2. During the dead time, the semiconductor switching elements 21s, 22s (33s, 34s) of the Leg A are all turned off.

The protection mode is a control mode performed when the DC terminals P, N are short-circuited. In the protection mode, the first converter cell 10A (10B) is controlled by the mode 3, that is, all the semiconductor switching elements 21s, 22s, 24s (31s, 33s, 34s) are controlled to be OFF.

Next, two kinds of configurations (second converter cells 15A, 15B) of the second converter cell 15 will be described below. FIG. 6(*a*) and FIG. 6(*b*) are circuit diagrams showing the configurations of the second converter cells 15A, 15B. FIG. 7 is a diagram illustrating operations of the second converter cells 15A, 15B.

As shown in FIG. 6(*a*), the second converter cell 15A includes: a Leg Aa which is a first bridge having upper and lower arms both formed by semiconductor switches 41, 42;

and a capacitor 40 as an energy storing element, and forms a half-bridge circuit in which the Leg Aa is connected in parallel to the capacitor 40. A positive cell output terminal Po is connected to a connection point between the semiconductor switches 41, 42, which is the middle point in the Leg Aa, and a negative cell output terminal No is connected to a connection point between the semiconductor switch 42 and the capacitor 40.

As shown in FIG. 6(b), the second converter cell 15B includes: a Leg Aa which is a first bridge having upper and lower arms both formed by semiconductor switches 51, 52; and a capacitor 40, and forms a half-bridge circuit in which the Leg Aa is connected in parallel to the capacitor 40. A negative cell output terminal No is connected to a connection point between the semiconductor switches 51, 52, which is the middle point in the Leg Aa, and a positive cell output terminal Po is connected to a connection point between the semiconductor switch 51 and the capacitor 40.

It is noted that the semiconductor switches 41, 42, 51, 52 are respectively composed of semiconductor switching elements 41s, 42s, 51s, 52s and flyback diodes 41d, 42d, 51d, 52d connected in antiparallel thereto. As the semiconductor switching elements 41s, 42s, 51s, 52s, self-turn-off semiconductor switching elements such as IGBT, GCT, or MOS-FET are used. If diodes (body diodes) are included in the semiconductor switching elements 41s, 42s, 51s, 52s, the flyback diodes 41d, 42d, 51d, 52d may be omitted.

Next, a switching state and an operation mode of the second converter cell 15A (15B) will be described with reference to FIG. 7.

When the semiconductor switching element 41s (52s) is ON and the semiconductor switching element 42s (51s) is OFF, voltage between both ends of the capacitor 40 is outputted between the output terminals of the second converter cell 15A (15B) (mode 1). When the semiconductor switching element 41s (52s) is OFF and the semiconductor switching element 42s (51s) is ON, zero voltage is outputted (mode 2).

In both the steady mode and the protection mode, the second converter cell 15A (15B) is controlled by the mode 1 and the mode 2, and the semiconductor switching elements 41s, 42s (51s, 52s) of the Leg Aa are subjected to switching control on the basis of generated voltage commands.

In the steady mode, control for the Leg B of the first converter cell 10A, 10B is fixed control, and control for the Leg A of the first converter cell 10A is equivalent to control for the second converter cell 15A. In addition, control for the Leg A of the first converter cell 10B is equivalent to control for the second converter cell 15B. If voltages of the capacitors 20, 40 are the same, voltage outputted from the first converter cell 10A, 10B is equivalent to voltage outputted from the second converter cell 15A, 15B.

Thus, with the Leg B controlled in a fixed manner, the first converter cell 10 (10A, 10B) can be controlled in the same manner as in a half-bridge circuit, i.e., the second converter cell 15 (15A, 15B), and therefore, the following control is performed using a control method described in Non-Patent Document 1, for example.

The control device 2 calculates voltage commands for converter cells (first converter cell 10, second converter cell 15) of the first arms 4 and the second arms 5. The voltage command for each converter cell is calculated so as to generate desired AC voltage and DC voltage while controlling capacitor voltage by average value control for causing a DC voltage average value of each converter cell to follow a capacitor voltage command value, and balance control for balancing DC voltages of the converter cells. Then, on the basis of the calculated voltage commands, the control device 2 generates a control signal for performing switching control, by PWM control, for the semiconductor switching elements in the Leg A of the first converter cell 10 and the second converter cell 15, i.e., the Leg A and the Leg Aa. This control signal is, together with a control signal for controlling the Leg B in a fixed manner, outputted as a control signal 2a from the control device 2 to each converter cell (first converter cell 10, second converter cell 15).

Figure 8:
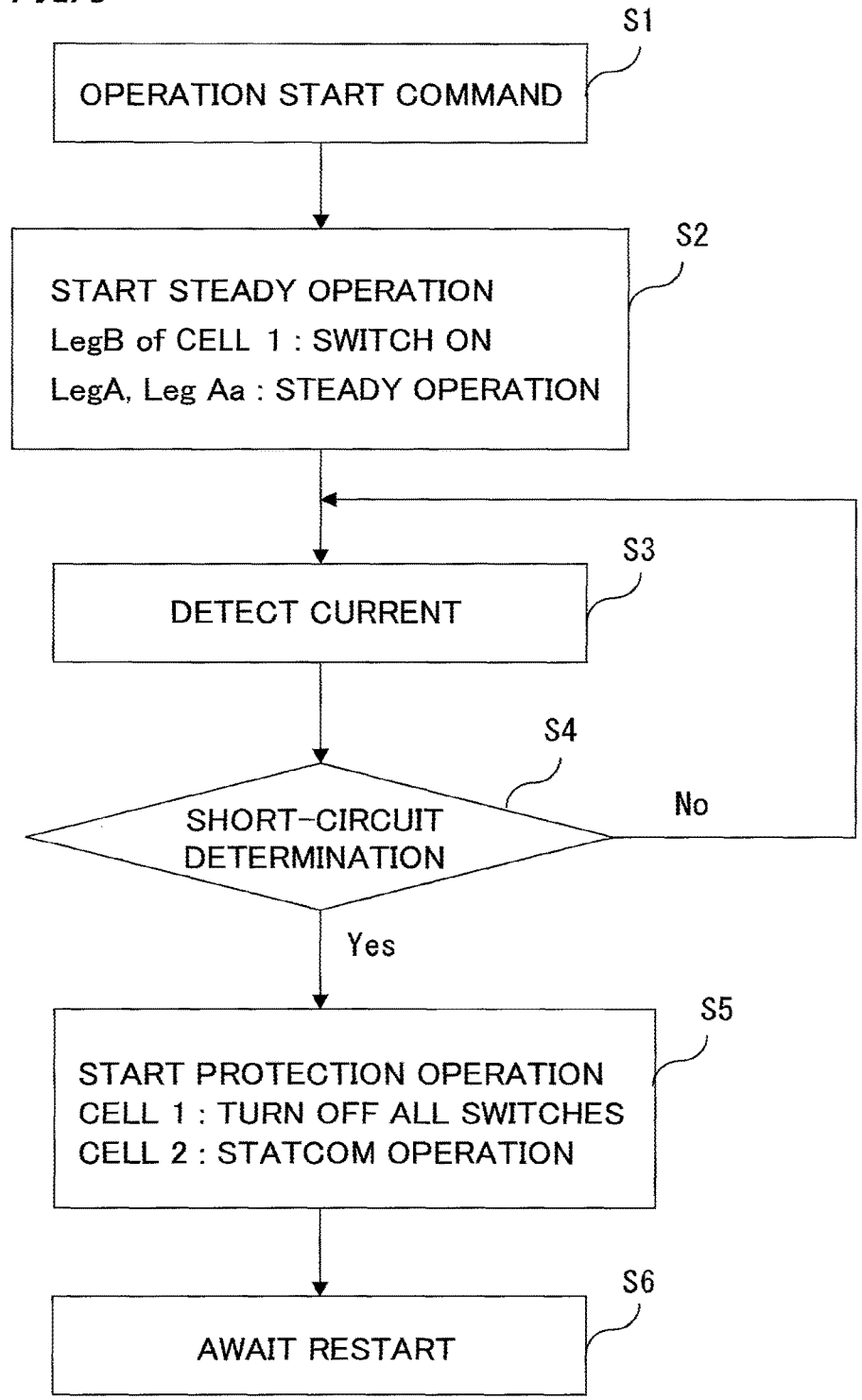
FIG. 8 is a flowchart illustrating control operation of the electric power conversion device according to embodiment 1 of the present invention.

FIG. 8 is a flowchart illustrating control operation of the electric power conversion device 100 in the present embodiment 1.

When an operation start command is given (step S1), the control device 2 starts control in the steady mode, and the power converter 1 starts steady operation. That is, the semiconductor switching element of the Leg B of the first converter cell 10 is fixed in an ON state, and the semiconductor switching elements in the Leg A of the first converter cell 10 and the second converter cell 15, i.e., the Leg A and the Leg Aa, are caused to perform steady operation, that is, subjected to switching control by PWM control on the basis of the aforementioned voltage commands (step S2).

Next, the control device 2 obtains detected current from the current detector 11 (step S3), and by a short-circuit determination unit, determines whether or not short-circuit has occurred between the DC terminals P, N, on the basis of the detected current. For example, when the detected current becomes overcurrent exceeding a set reference value, it is determined that short-circuit has occurred (step S4).

It is noted that the current detector 11 detects current flowing through the DC terminal P, and if it is determined that short-circuit has not occurred in step S4, the process returns to step S3 and the control device 2 periodically and repeatedly performs the operation of obtaining detected current from the current detector 11 and performing short-circuit determination.

In step S4, if it is determined that short-circuit has occurred between the DC terminals P, N, the control device 2 starts control in the protection mode and the power converter 1 starts protection operation. That is, all the semiconductor switching elements in each first converter cell 10 of the first arms 4 are controlled to be OFF, and the second converter cells 15 for three phases of the second arms 5 are caused to operate as a STATCOM (step S5). It is noted that the control for the first converter cells 10 of the first arm 4 and the control for the second converter cells 15 of the second arm 5 may be started at the same time, or either one of them may be started first.

Then, a restart for starting again operation of performing power transmission between the AC terminals U, V, W and the DC terminals P, N, is awaited (step S6).

As described above, when short-circuit between the DC terminals P, N is detected, the control device 2 switches the control mode from the steady mode to the protection mode, to control all the semiconductor switching elements in each first converter cell 10 of the first arms 4 to be OFF, and cause the second converter cells 15 for three phases of the second arms 5 to operate as a STATCOM. The second converter cells 15 for three phases of the second arms 5 have the same configuration as in the modular multilevel converter of star-connection type, and therefore, the following control is performed using the control method described in Non-Patent Document 2, for example.

The control device 2 calculates voltage commands so as to generate reactive power having desired AC voltage to the AC terminals U, V, W while controlling capacitor voltage of each second converter cell 15. Then, the semiconductor switching elements in each second converter cell 15 are subjected to switching control by PWM control on the basis of the calculated voltage commands, whereby each second converter cell 15 of the second arm 5 performs reactive power compensation operation.

In this case, since the second converter cell 15 has a half-bridge configuration and can output only positive voltage, the reactive power compensation operation is controlled using voltage commands on which common DC voltage is superimposed among all the phases, whereby it becomes possible to output desired AC voltage. Zero-phase voltage occurs due to the superimposed DC voltage, but does not influence the AC voltage.

When the DC terminals P, N are short-circuited, in the protection mode of the control device 2, all the semiconductor switching elements in each first converter cell 10 of the first arms 4 are OFF, and therefore short-circuit current ia does not flow, or hardly flows if any.

Figure 9:
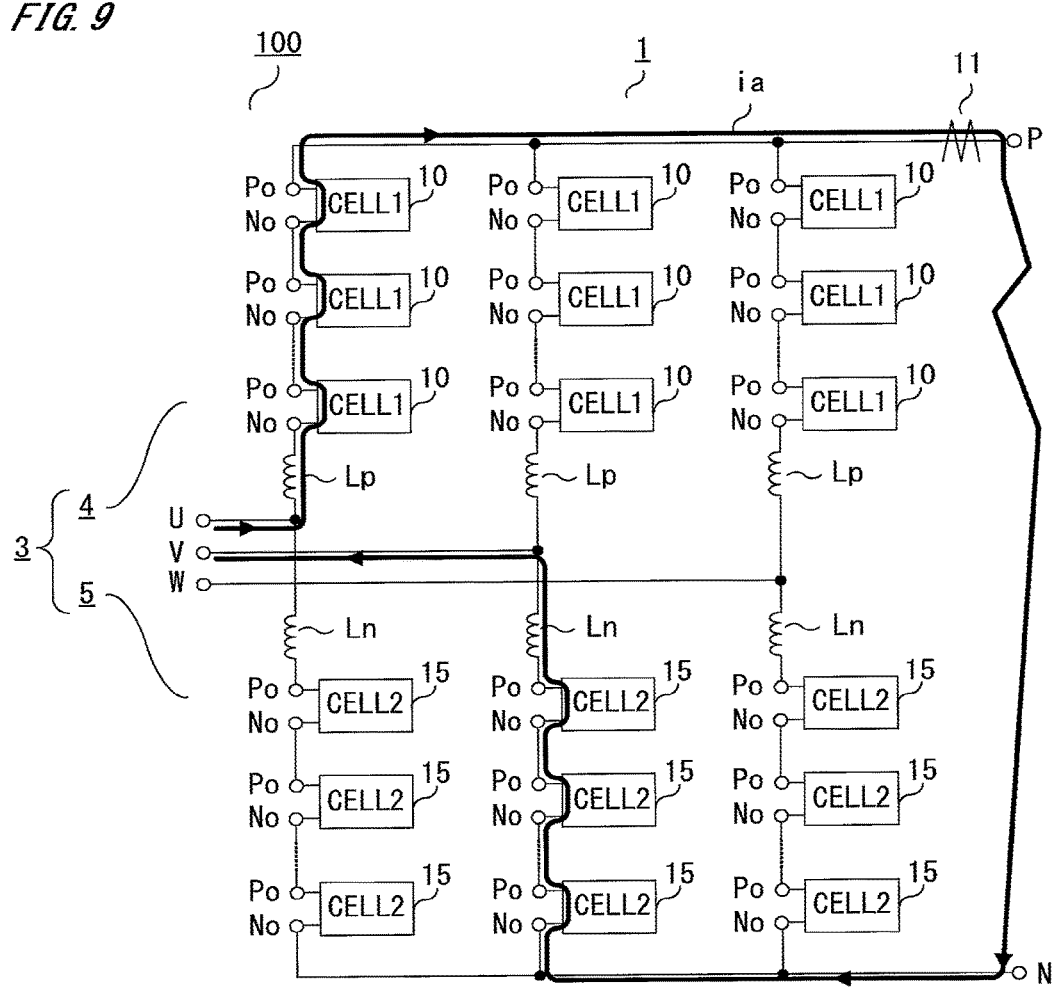
FIG. 9 is a diagram illustrating a route of short-circuit current flowing in a power converter according to embodiment 1 of the present invention.

As an example, FIG. 9 shows a current route of short-circuit current ia flowing from U phase to V phase. The short-circuit current ia flows from the negative cell output terminal No to the positive cell output terminal Po of each of the first and second converter cells 10, 15.

FIG. 10 is a diagram illustrating a route of short-circuit current ia flowing through the first converter cell (10A, 10B). In particular, FIG. 10(a) shows a route of short-circuit current ia flowing from the negative cell output terminal No to the positive cell output terminal Po of the first converter cell 10A, and FIG. 10(b) shows a route of short-circuit current ia flowing from the negative cell output terminal No to the positive cell output terminal Po of the first converter cell 10B.

In the first converter cell 10A (10B), since all the semiconductor switching elements 21s, 22s, 24s (31s, 33s, 34s) are OFF, as shown in FIG. 10, the short-circuit current ia flows through a route like a diode rectifier. In this case, the capacitor 20 in the first converter cell 10A (10B) acts to suppress the short-circuit current ia. If voltage between the cell output terminals No, Po is lower than the capacitor voltage, the diodes 23, 22d (32, 33d) in the first converter cell 10A (10B) do not conduct current, and thus the short-circuit current ia does not flow. The cell output terminals No, Po of the first converter cells 10 are connected in series, and therefore, on the whole, if voltage among the AC terminals U, V, W is lower than a sum of the capacitor voltages in the short-circuit current route, the short-circuit current ia does not flow.

Here, the capacitor voltage is not a rated usage voltage of the capacitor 20 but a charge voltage (usage voltage) in an actual usage state.

Figure 11:
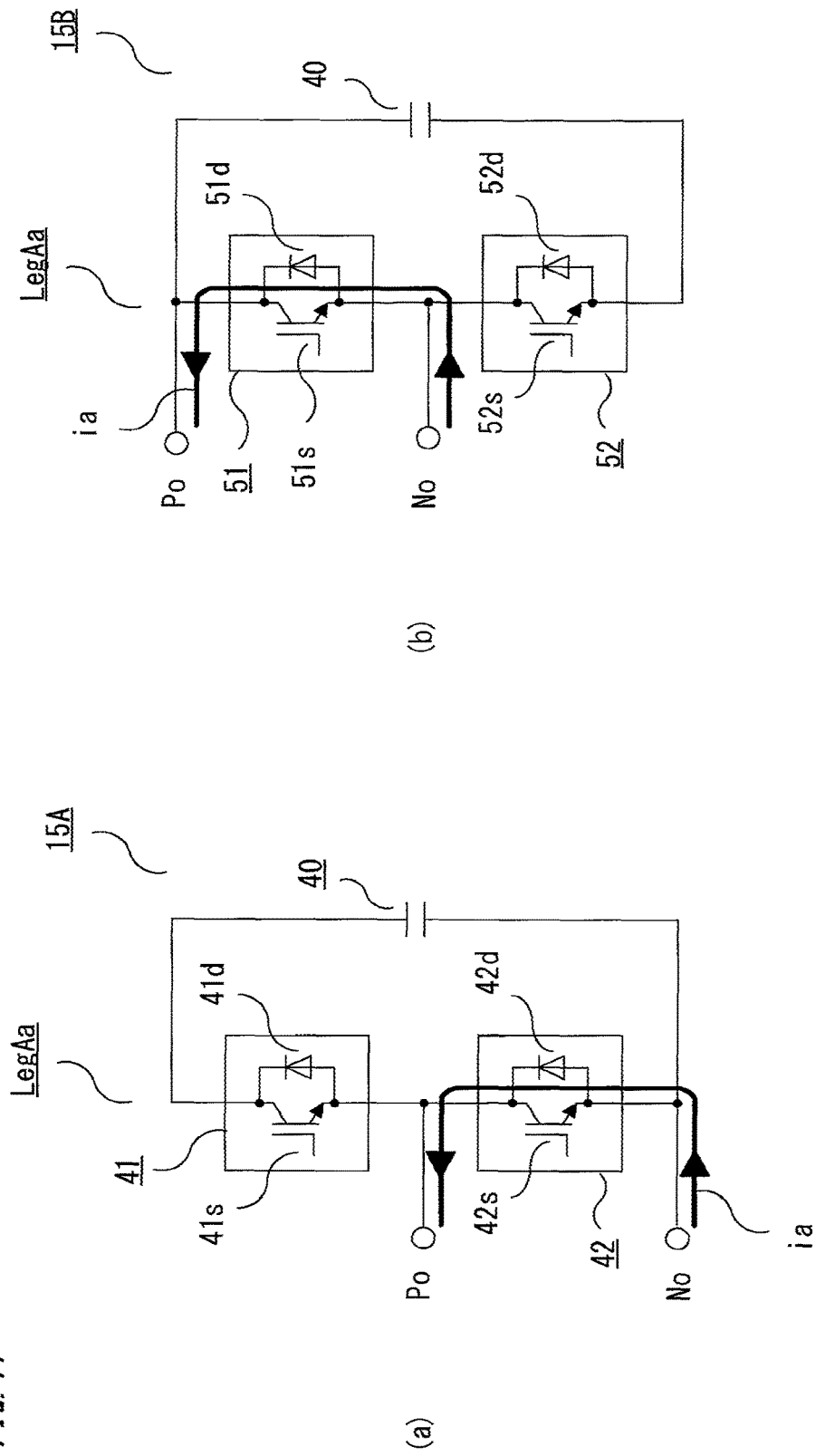
FIG. 11 is a diagram illustrating a route of short-circuit current flowing through the second converter cell according to embodiment 1 of the present invention.

FIG. 11 is a diagram illustrating a route of short-circuit current ia flowing through the second converter cell (15A, 15B). In particular, FIG. 11(a) shows a route of short-circuit current ia flowing from the negative cell output terminal No to the positive cell output terminal Po of the second converter cell 15A, and FIG. 11(b) shows a route of short-circuit current ia flowing from the negative cell output terminal No to the positive cell output terminal Po of the second converter cell 15B.

Although the second converter cell 15A (15B) performs reactive power compensation operation, only a short-circuit current component is shown in FIG. 11. In this case, supposing that short-circuit current ia flows, the short-circuit current ia flows from the negative cell output terminal No to the positive cell output terminal Po via the semiconductor switch 42 (51), irrespective of the switching state of the second converter cell 15A (15B).

It is noted that, in the present embodiment, for the purpose of maintaining output operation in the steady mode, a sum of the capacitor voltages in each of the first and second arms 4, 5 is set to be higher than voltage between the AC terminals (in the case of being connected to an AC grid, grid voltage). Therefore, in principle, short-circuit current ia does not flow in the protection mode. Even if short-circuit current ia flows, the short-circuit current ia is suppressed by a sum of the capacitor voltages in the short-circuit current route and thus hardly flows.

As described above, in the electric power conversion device 100 according to the present embodiment 1, when short-circuit between the DC terminals P, N is detected, all the semiconductor switching elements in each first converter cell 10 of the first arms 4 are turned off, and the second converter cells 15 of the second arms 5 are caused to operate as a STATCOM. Thus, overcurrent (short-circuit current ia) occurring due to short-circuit between the DC terminals P, N can be suppressed, and also, reactive power can be continuously outputted to the AC terminals U, V, W even when short-circuit occurs. Therefore, it is possible to continue operation with high reliability without adversely influencing the AC side, e.g., an AC grid.

In the present embodiment, the second converter cell 15 of the second arm 5 has a half-bridge configuration, and the first converter cell 10 of the first arm 4 has a full-bridge configuration including: the Leg A having upper and lower arms both having semiconductor switching elements; and the Leg B having upper and lower arms one of which has a semiconductor switching element and the other of which has only a diode. Therefore, the number of semiconductor switching elements can be decreased, and the device configuration of the electric power conversion device 100 can be reduced in size and cost. In addition, the failure rate of elements decreases and reliability is improved. Further, it is possible to achieve a high-performance electric power conversion device 100 that has such a device configuration reduced in size and cost and having high reliability and that is capable of performing operation with high reliability when the DC terminals P, N are short-circuited, as described above.

In the steady mode, the semiconductor switching element in the Leg B of the first converter cell 10 is controlled to be fixed in an ON state. Therefore, the circuit configuration in the control device 2 can be simplified, whereby a further small-sized and highly reliable electric power conversion device 100 can be achieved.

In the diode 23, 32 used in the Leg B of the first converter cell 10, current flows only during a comparatively short period in the protection mode. Therefore, the rated current of the diode 23, 32 can be set to be smaller than the rated current of the semiconductor switching element through which current flows in the steady mode, and the rated current of the flyback diode connected in antiparallel thereto, whereby the size and the cost can be further reduced. One example of methods for reducing the rated current is to reduce the area of a semiconductor chip forming the diode 23, 32.

In FIG. 1 in the above embodiment 1, the first arm 4 having the first converter cell 10 is shown as a positive-side arm, and the second arm 5 having the second converter cell 15 is shown as a negative-side arm. However, the first arm 4 may be set as a negative-side arm and the second arm 5 may be set as a positive-side arm.

In each leg circuit 3, the first arm 4 has only the first converter cell 10 having a full-bridge configuration, and the second arm 5 has only the second converter cell 15 having a half-bridge configuration. However, each of the first and second arms 4, 5 may have both the first converter cell 10 and the second converter cell 15.

In this case, in the protection mode, the control device 2 turns off the semiconductor switching elements in all the converter cells (first and second converter cells 10, 15) of the first arms 4, and causes the first and second converter cells 10, 15 for three phases of the second arms 5 to operate as a STATCOM. It is noted that the capacitor 20 of the first converter cell 10 in each second arm 5 does not contribute to suppression of the short-circuit current ia.

If a sum of the capacitor voltages of the first converter cells 10 in each first arm 4 is higher than voltage among the AC terminals, that is, if the first arm 4 includes more first converter cells 10 than the number of cells calculated by "maximum value of voltages among AC terminals"/"capacitor voltage", short-circuit current ia does not flow. The configuration for the positive-side reactor Lp and the negative-side reactor Ln, and the configuration for the current detector 11, are not limited to those shown in FIG. 1.

In FIG. 1, the current detector 11 is provided on the positive DC terminal P side. However, the current detector 11 may be provided on the negative DC terminal N side.

The current detector 11 may be configured to be at least capable of directly or indirectly detect current flowing through the semiconductor switching elements in the power converter 1, in order to detect short-circuit between the DC terminals P, N.

Figure 12:
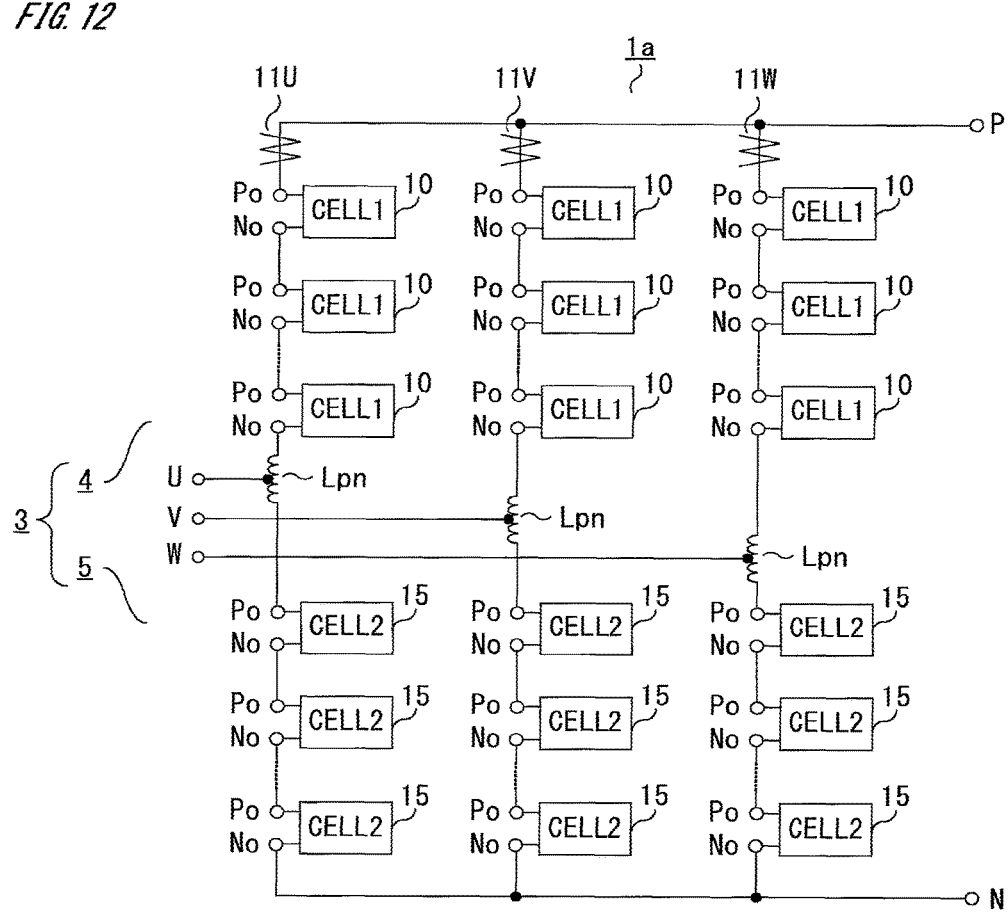
FIG. 12 is a schematic configuration diagram of a power converter in another example of embodiment 1 of the present invention.

In a power converter 1a shown in FIG. 12, three-terminal reactors Lpn each obtained by coupling a positive-side reactor and a negative-side reactor are connected on the AC end sides. In addition, current detectors 11U, 11V, 11W are provided on the positive sides of the positive-side arms (in this case, first arms 4) for respective phases.

Figure 13:
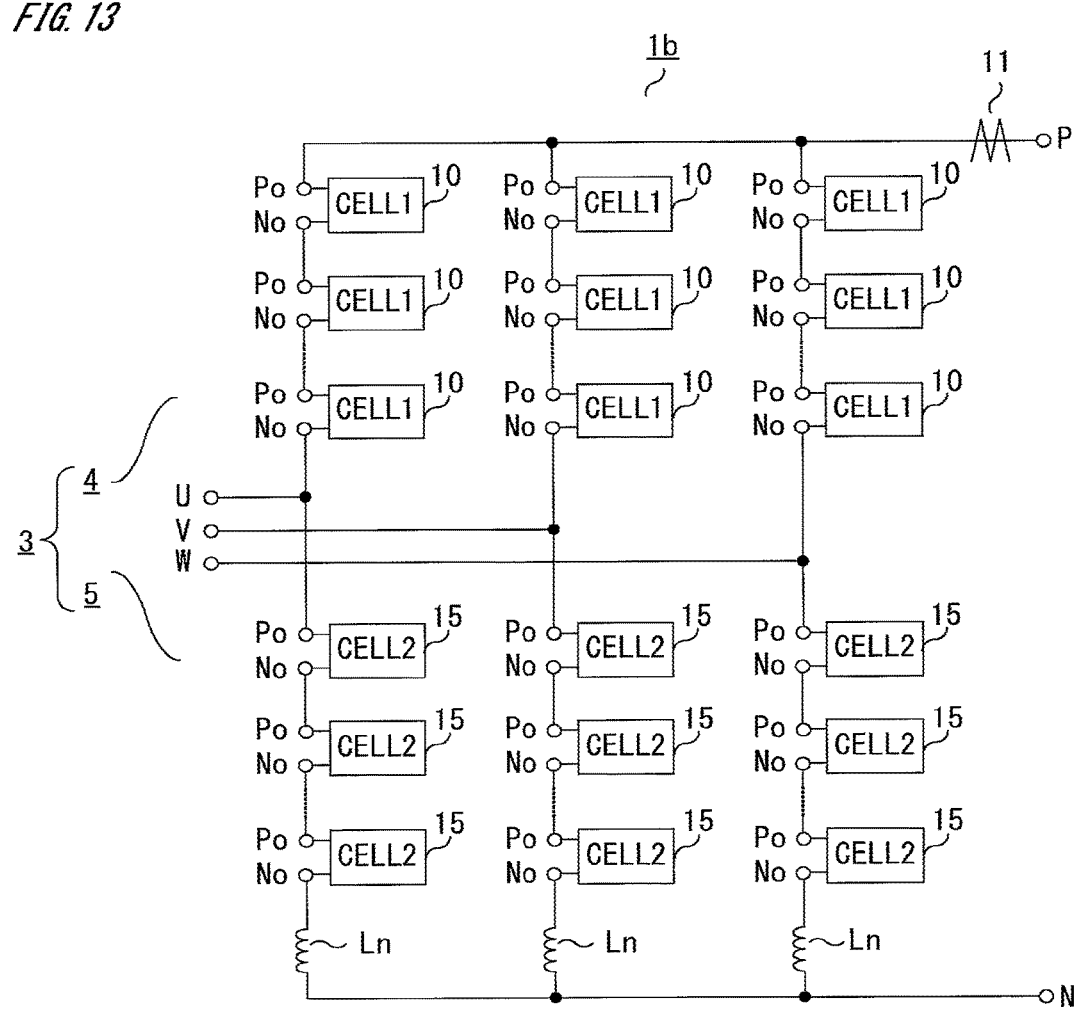
FIG. 13 is a schematic configuration diagram of a power converter in another example of embodiment 1 of the present invention.

In a power converter 1b shown in FIG. 13, only the negative-side reactor Ln is connected to the negative-side arm (in this case, second arm 5) for each phase. It is also possible that only the positive-side reactor Lp is connected to the positive-side arm for each phase.

As the positive-side reactor Lp and the negative-side reactor Ln, inductance components may be provided, and for example, an inductance of a wire such as a cable may be used. In a power converter 1c shown in FIG. 14, an inductance of a wire is used instead of connecting a reactor.

Embodiment 2

Figure 15:
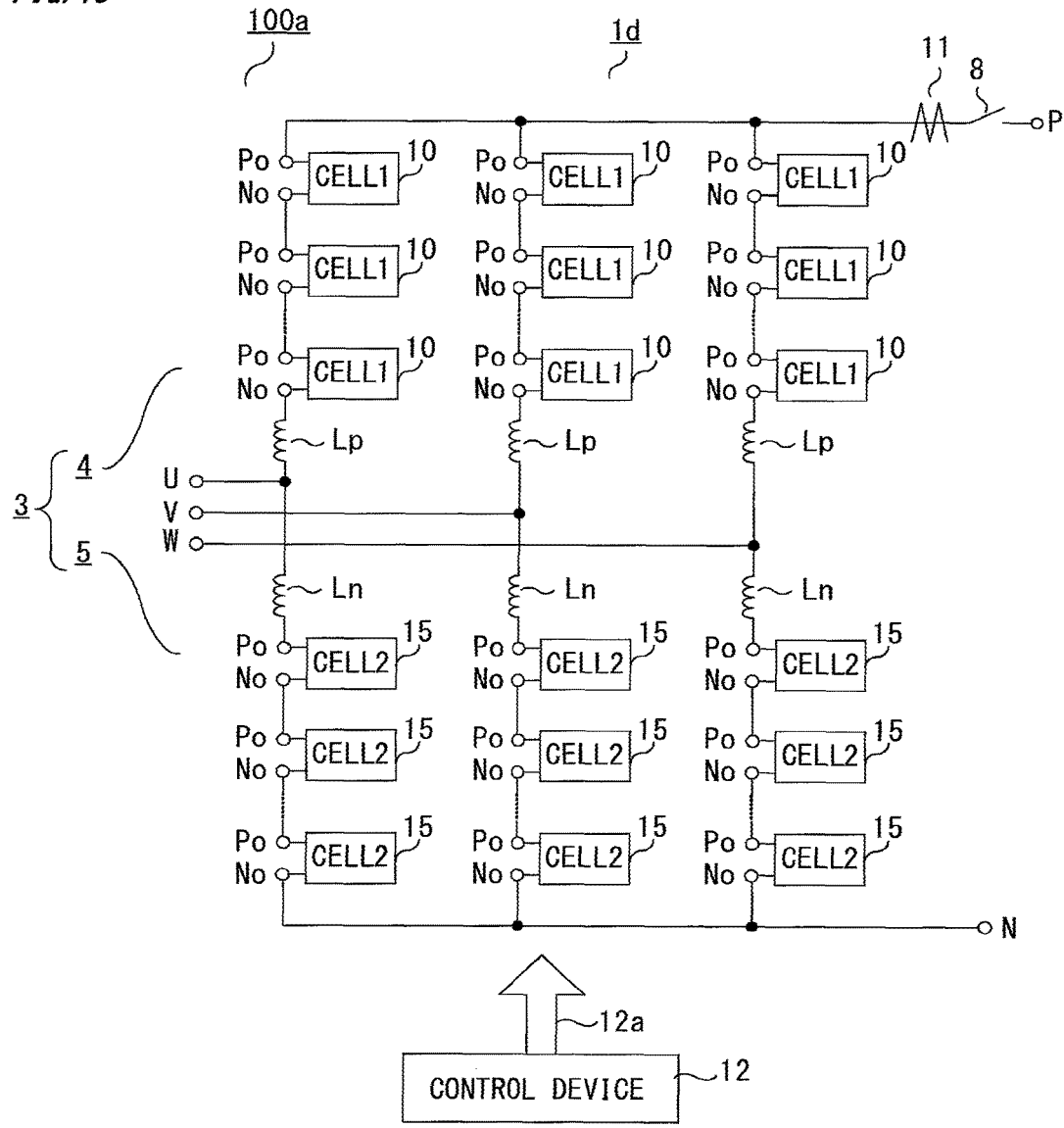
FIG. 15 is a schematic configuration diagram of an electric power conversion device according to embodiment 2 of the present invention.

Next, an electric power conversion device according to embodiment 2 of the present invention will be described. FIG. 15 is a schematic configuration diagram of the electric power conversion device according to embodiment 2 of the present invention.

As shown in FIG. 15, the electric power conversion device 100a includes a power converter 1d which is a main circuit, and a control device 12 for controlling the power converter 1d. The control device 12 outputs a control signal 12a to control the power converter 1d.

In the present embodiment 2, a positive DC terminal P of the power converter 1d is connected to an open/close device 8 as an open/close portion. The open/close device 8 may be connected to a negative DC terminal N. The power converter 1d may have the open/close device 8, or the open/close device 8 may be externally connected. The other configurations are the same as in the above embodiment 1.

The open/close portion (open/close device 8) connected to the positive DC terminal P has a function of separating potentials of two conductors having the same potential, from each other. Instead of the open/close device 8, a circuit breaker or a disconnector may be used. Further, a mechanical open/close portion or an open/close portion using a semiconductor element may be used.

Figure 16:
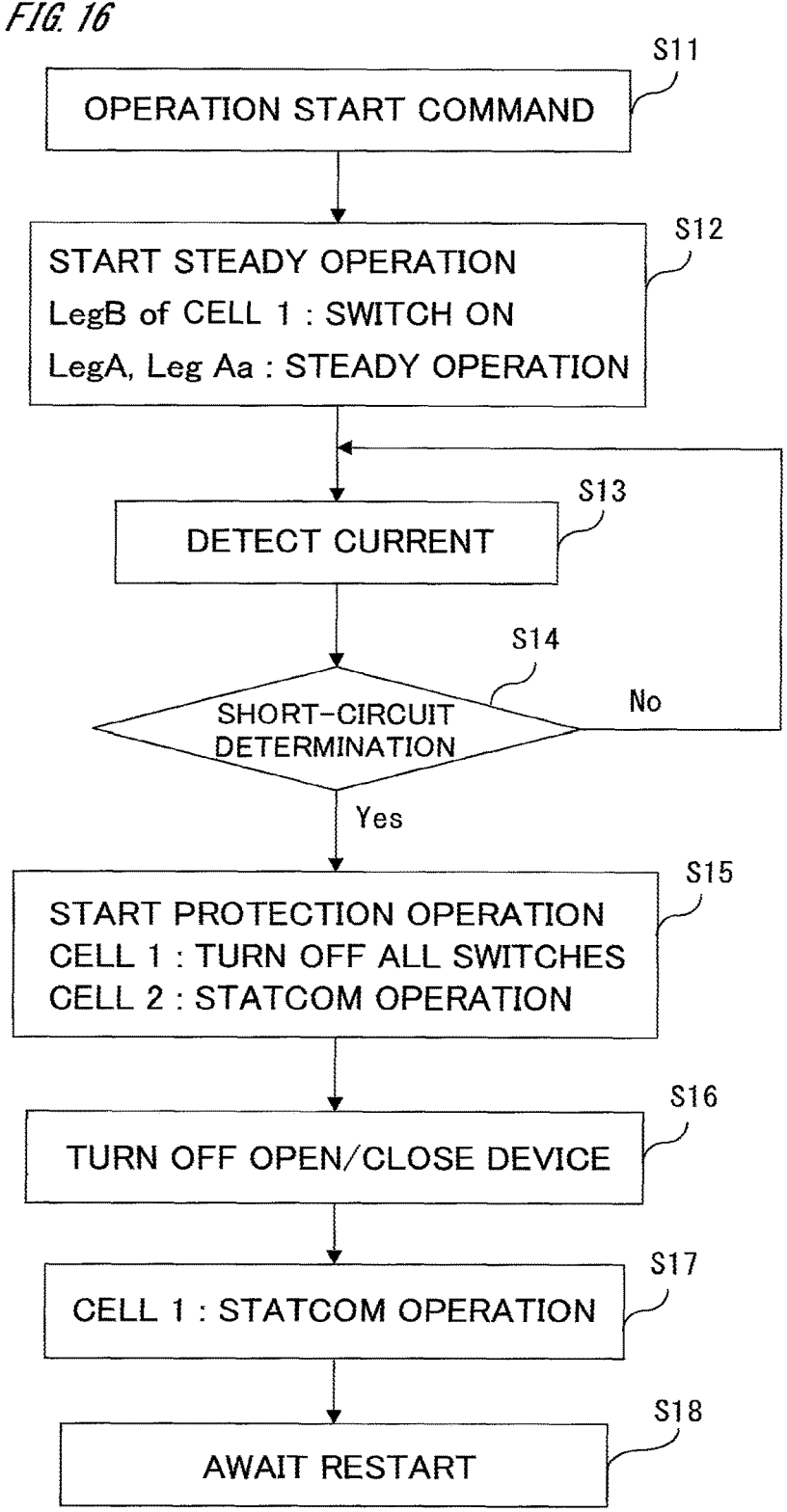
FIG. 16 is a flowchart illustrating control operation of the electric power conversion device according to embodiment 2 of the present invention.

FIG. 16 is a flowchart illustrating control operation of the electric power conversion device 100d according to the present embodiment 2.

When an operation start command is given (step S11), the control device 12 starts control in the steady mode and the power converter id starts steady operation as in the above embodiment 1. That is, the semiconductor switching element of the Leg B of the first converter cell 10 is fixed in an ON state, and the semiconductor switching elements in the Leg A of the first converter cell 10 and the second converter cell 15, i.e., the Leg A and the Leg Aa, are caused to perform steady operation (step S12).

Next, the control device 12 obtains detected current from the current detector 11 (step S13), and as in the above embodiment 1, by a short-circuit determination unit, determines whether or not short-circuit has occurred between the DC terminals P, N, on the basis of the detected current (step S14).

If it is determined that short-circuit has not occurred in step S14, the process returns to step S13 and the control device 12 periodically and repeatedly performs the operation of obtaining detected current from the current detector 11 and performing short-circuit determination.

In step S14, if it is determined that short-circuit has occurred between the DC terminals P, N, the control device 12 starts control in the protection mode and the power converter 1d starts protection operation as in the above embodiment 1. That is, all the semiconductor switching elements in each first converter cell 10 of the first arms 4 are controlled to be OFF, and the second converter cells 15 for three phases of the second arms 5 are caused to operate as a STATCOM (step S15). It is noted that the control for the first converter cell 10 of the first arm 4 and the control for the second converter cell 15 of the second arm 5 may be started at the same time, or either one of them may be started first.

Next, the control device 12 operates the open/close device 8 to be OFF (opened). It is noted that, in general, it takes 5 ms to 10 ms until the open/close device 8 is actually turned off. Therefore, when starting the control in the protection mode in step S15, the control device 12 outputs a command for turning off the open/close device 8, at the same time (step S16).

Next, the first converter cells 10 for three phases of the first arms 4 are caused to operate as a STATCOM, as in the second converter cells 15 (step S17).

Then, a restart for starting again operation of performing power transmission between the AC terminals U, V, W and the DC terminals P, N, is awaited (step S18).

In the present embodiment, when short-circuit between the DC terminals P, N is detected, as in the above embodiment 1, the control device 12 switches from the steady mode to the protection mode, to turn off all the semiconductor switching elements in each first converter cell 10 of the first arms 4, and cause the second converter cells 15 of the second arms 5 to operate as a STATCOM. Then, in a state in which overcurrent (short-circuit current ia) occurring due to short-circuit between the DC terminals P, N is suppressed, the open/close device 8 is turned off to open the short-circuit current route, and the first converter cells 10 of the first arms 4 are also caused to operate as a STATCOM, as in the second converter cells 15.

As described above, when the second converter cells 15 of the second arms 5 are caused to operate as a STATCOM, the second converter cells 15 perform reactive power compensation operation using voltage commands on which common DC voltage is superimposed among all the phases. Then, after the open/close device 8 is turned off, the first converter cells 10 of the first arms 4 also perform reactive power compensation operation using voltage commands on which common DC voltage is superimposed among all the phases, as in the second converter cells 15. The DC voltage to be superimposed for the first converter cells 10 of the first arms 4 is equal to that for the second converter cells 15 of the second arms 5.

In the case where only the second converter cells 15 of the second arms 5 are caused to operate as a STATCOM, zero-phase voltage occurs due to the superimposed DC voltage. Normally, the zero-phase voltage does not cause a problem. However, in the case where a neutral point of three phases is formed by a reactor, a transformer, or the like among the AC terminals U, V, W of the electric power conversion device 100a and the neutral point is grounded, zero-phase current corresponding to current to ground can flow due to the zero-phase voltage. There is a possibility that the current to ground causes an adverse influence such as erroneous operation of another device, and therefore it is necessary to reduce the current to ground as much as possible.

In the present embodiment, the open/close device 8 is turned off, the first converter cells 10 of the first arms 4 and the second converter cells 15 of the second arms 5 are both caused to operate as a STATCOM. Therefore, the polarity of zero-phase voltage is reversed between the first arm 4 side and the second arm 5 side, and the current to ground does not flow. Therefore, an adverse influence on another device can be suppressed, and reliability of the electric power conversion device 100a is improved.

Therefore, as in the above embodiment 1, excessive short-circuit current is does not flow when the DC terminals P, N are short-circuited, and reactive power can be continuously outputted to the AC terminals U, V, W. Further, since the current to ground can be suppressed, an adverse influence on another device can be suppressed. Therefore, it is possible to continue operation with high reliability while preventing an adverse influence on the AC side, e.g., an AC grid and suppressing an adverse influence on another device. In addition, as in the above embodiment 1, it is possible to achieve a high-performance electric power conversion device 100a that has a device configuration reduced in size and cost and having high reliability and that is capable of performing operation with high reliability when the DC terminals P, N are short-circuited.

At the time when the open/close device 8 is turned off, all the semiconductor switching elements of each first converter cell 10 have been turned off and short-circuit current is is suppressed. Therefore, the open/close device 8 interrupts zero current or extremely small current. Therefore, the open/close portion (open/close device 8) does not need a great current-interruption capability, and for example, the maximum current that can be interrupted, which represents the current-interruption capability, is set to be smaller than twice the rated DC current of the power converter id. It is noted that the current-interruption capability of general current interruption means used in an electric power conversion device is about twice the rated DC current.

In the above embodiment, while the DC terminals P, N are being short-circuited, the second converter cells 15 of the second arms 5 are continuously caused to operate as a STATCOM. However, the second converter cells 15 may be stopped as necessary, and after the open/close device 8 is turned off and the short-circuit is eliminated, the second converter cells 15 may be caused to operate as a STATCOM.

Although the effect of suppressing current to ground is not obtained, after the open/close device 8 is turned off and the short-circuit is eliminated, only the second converter cells 15 may be continuously caused to operate as a STATCOM while the first converter cells 10 of the first arms 4 are not caused to operate as a STATCOM.

As in the above embodiment 1, each of the first and second arms 4, 5 may include both the first converter cell 10 and the second converter cell 15.

In this case, in the protection mode, the control device 2 turns off the semiconductor switching elements in all the converter cells (first and second converter cells 10, 15) of the first arms 4, and causes the first and second converter cells 10, 15 for three phases of the second arms 5 to operate as a STATCOM. Then, after turning off the open/close device 8, the control device 2 also causes the first and second converter cells 10, 15 for three phases of the first arms 4 to operate as a STATCOM.

Figure 14:
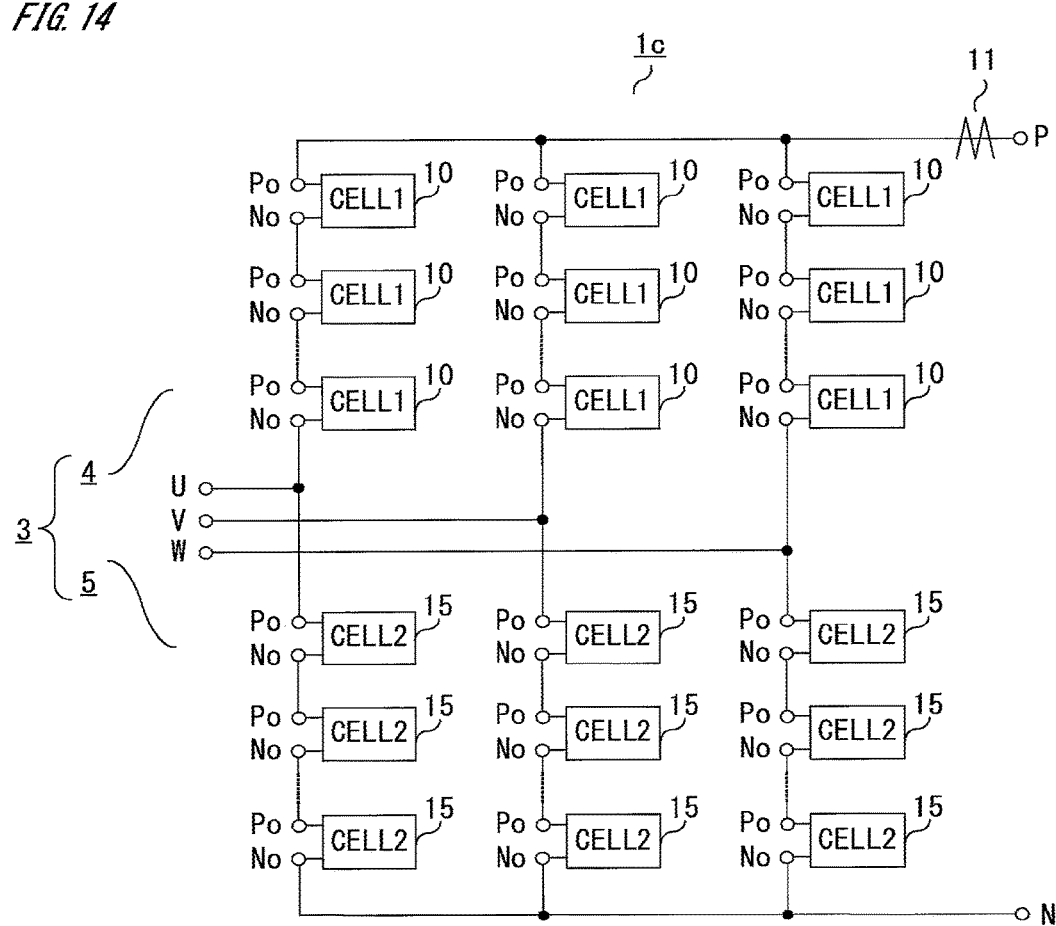
FIG. 14 is a schematic configuration diagram of a power converter in another example of embodiment 1 of the present invention.

Also in the present embodiment, as in the above embodiment 1, the positive-side reactor Lp and the negative-side reactor Ln, and the current detector 11 may be configured as shown in FIG. 12 to FIG. 14, and are not limited thereto.

Embodiment 3

Next, an electric power conversion device according to embodiment 3 of the present invention will be described. In the present embodiment 3, the configuration of the electric power conversion device 100 shown in FIG. 1 in the above embodiment 1 is used, but the control operation is different.

The control device 2 has, as the control mode, a steady mode and a protection mode as in the above embodiment 1, and further a standby mode, to control the power converter 1. In the standby mode, all the semiconductor switching elements in each converter cell (first converter cell 10, second converter cell 15) of the first arms 4 and the second arms 5 are controlled to be OFF.

Figure 17:
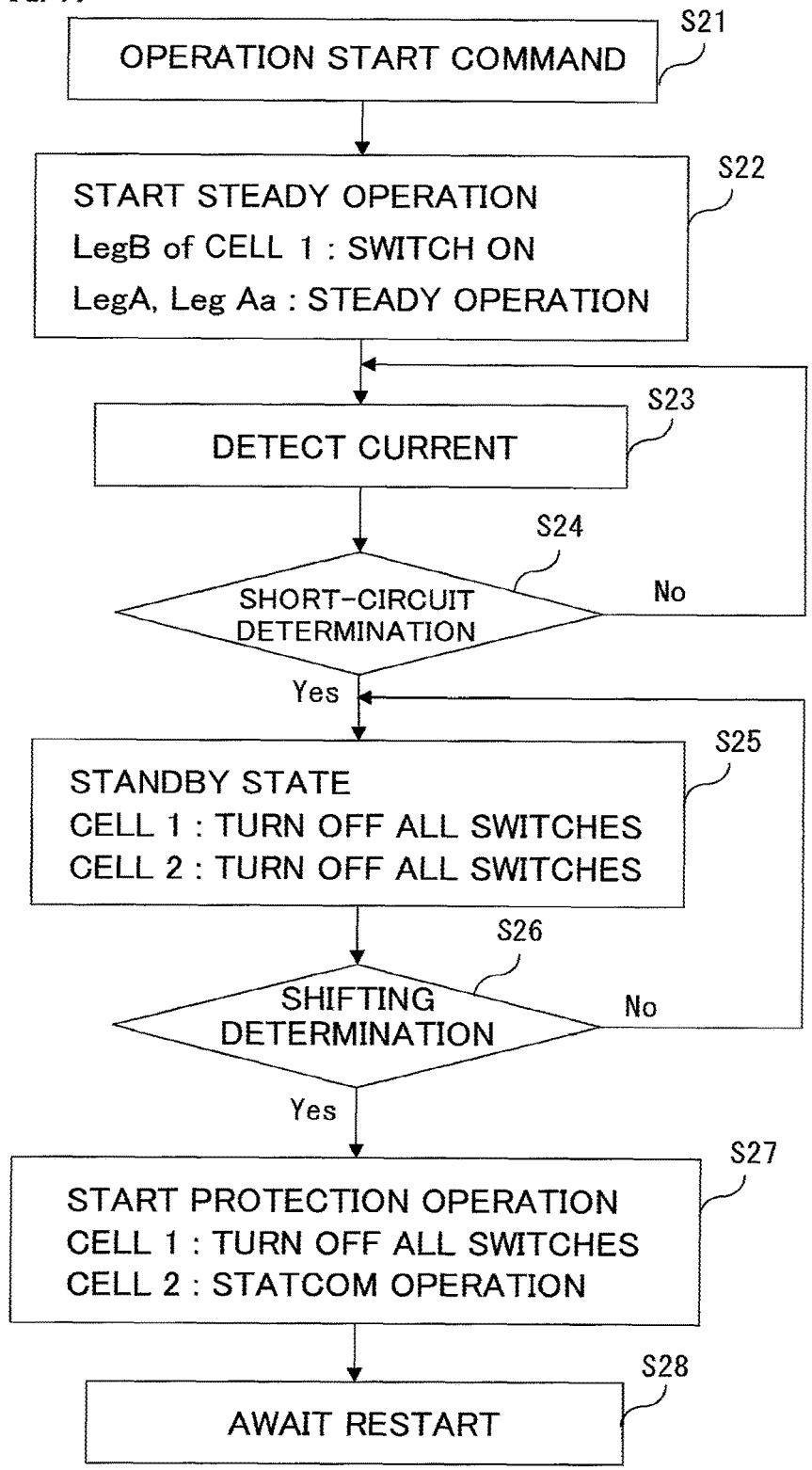
FIG. 17 is a flowchart illustrating control operation of an electric power conversion device according to embodiment 3 of the present invention.

FIG. 17 is a flowchart illustrating control operation of the electric power conversion device 100 according to the present embodiment 3.

When an operation start command is given (step S21), the control device 2 starts control in the steady mode and the power converter 1 starts steady operation as in the above embodiment 1. That is, the semiconductor switching element of the Leg B of the first converter cell 10 is fixed in an ON state, and the semiconductor switching elements in the Leg A of the first converter cell 10 and the second converter cell 15, i.e., the Leg A and the Leg Aa, are caused to perform steady operation (step S22).

Next, the control device 2 obtains detected current from the current detector 11 (step S23), and as in the above embodiment 1, by a short-circuit determination unit, determines whether or not short-circuit has occurred between the DC terminals P, N, on the basis of the detected current (step S24).

If it is determined that short-circuit has not occurred in step S24, the process returns to step S23 and the control device 2 periodically and repeatedly performs the operation of obtaining detected current from the current detector 11 and performing short-circuit determination.

In step S24, if it is determined that short-circuit has occurred between the DC terminals P, N, the control device 2 starts control in the standby mode and the power converter 1 comes into a standby state.

That is, all the semiconductor switching elements in each converter cell (first converter cell 10, second converter cell 15) of the first arms 4 and the second arms 5 are controlled to be OFF (step S25).

On the basis of elapse of a predetermined standby period, the control device 2 determines whether to shift from the standby mode to the protection mode (step S26). Then, the control device 2 starts control in the protection mode and the power converter 1 starts protection operation as in the above embodiment 1. That is, all the semiconductor switching elements in each first converter cell 10 of the first arms 4 are controlled to be OFF, and the second converter cells 15 for three phases of the second arms 5 are caused to operate as a STATCOM (step S27).

Then, a restart for starting again operation of performing power transmission between the AC terminals U, V, W and the DC terminals P, N, is awaited (step S28).

Also in the present embodiment, as in the above embodiment 1, when short-circuit between the DC terminals P, N is detected, the electric power conversion device 100 performs the protection operation to turn off all the semiconductor switching elements in each first converter cell 10 of the first arms 4, and cause the second converter cells 15 of the second arms 5 to operate as a STATCOM. Thus, as in the above embodiment 1, overcurrent (short-circuit current ia) occurring due to short-circuit between the DC terminals P, N can be suppressed, and also, reactive power can be outputted to the AC terminals U, V, W even when short-circuit occurs. Therefore, it is possible to continue operation with high reliability without adversely influencing the AC side.

In addition, in the present embodiment, when short-circuit between the DC terminals P, N is detected during operation of the power converter 1 in the steady mode, prior to switching to the protection mode, the control device 2 switches to the standby mode during the set standby period, to bring the power converter 1 into a standby state in which all the semiconductor switching elements in each converter cell (first converter cell 10, second converter cell 15) of the first arms 4 and the second arms 5 are turned off.

Thus, by once bringing the power converter 1 into a standby state in which all the semiconductor switching elements are turned off before switching to the protection mode, overcurrent occurring due to short-circuit between the DC terminals P, N can be completely suppressed, and unnecessary current due to a transitional event can be prevented from flowing out to the AC side, e.g., the AC grid. Thus, the second converter cells 15 for three phases of the second arms 5 can be caused to operate as a STATCOM stably.

For the second converter cells 15 of the second arms 5, switching from the steady operation to the protection operation for operating as a STATCOM is performed via the standby state, and thus it is not necessary to perform the switching instantaneously. Therefore, time allowance arises in the process and thus the load on the control device 2 can be reduced. In the second converter cells 15 of the second arms 5, switching from the steady operation to the protection operation causes change in output current, and therefore, if the switching is performed instantaneously, high-speed current control is needed. However, in the present embodiment, since the switching is performed via the standby state, it is not necessary to configure a control system adaptable to high-speed current change, and the degree of freedom in control design is improved.

The power converter 1 is brought into a standby state while keeping the capacitor voltages without the power converter 1 being paralleled off from the AC side by an open/close device or the like. Therefore, at the time of starting the protection operation, the second converter cells 15 of the second arms 5 can start STATCOM operation immediately.

It is noted that, as the standby period during which control is performed in the standby mode, a time taken until a transitional event caused by short-circuit between the DC terminals P, N is settled is set in advance and used.

The determination of whether to shift from the standby mode to the protection mode in step S26 is not limited to the method using the set standby period. For example, the standby mode may be shifted to the protection mode by an operation command given from a system superior to the electric power conversion device 100.

Further, it is also possible to apply the present embodiment 3 to the above embodiment 2. That is, in a state in which overcurrent (short-circuit current ia) occurring due to short-circuit between the DC terminals P, N is suppressed after shifting to the protection mode, the open/close device 8 is turned off to open the short-circuit current route. Then, as is the second converter cells 15, the first converter cells 10 of the first arms 4 are also caused to operate as a STATCOM. Thus, the same effect as in the above embodiment 2 is also obtained.

Embodiment 4

Next, an electric power conversion device according to embodiment 4 of the present invention will be described. The electric power conversion device of the present embodiment 4 is configured by increasing the number of semiconductor elements (semiconductor switching elements, diodes) in each of the Leg A, the Leg B, and the Leg Aa of the first converter cell 10 and the second converter cell 15 in embodiment 1, and then connecting the semiconductor elements in parallel, in order to adapt to usage for large current capacity.

The configurations other than the first converter cell 10 and the second converter cell 15 are the same as in the above embodiment 1. In addition, the configurations of the first converter cell 10 and the second converter cell 15 shown in the present embodiment can be applied for the control of the electric power conversion devices 100, 100*a* described in the above embodiments 1 to 3 in the same manner.

First, two kinds of configurations (first converter cells 10C, 10D) of the first converter cell 10 will be described below.

Figure 18:
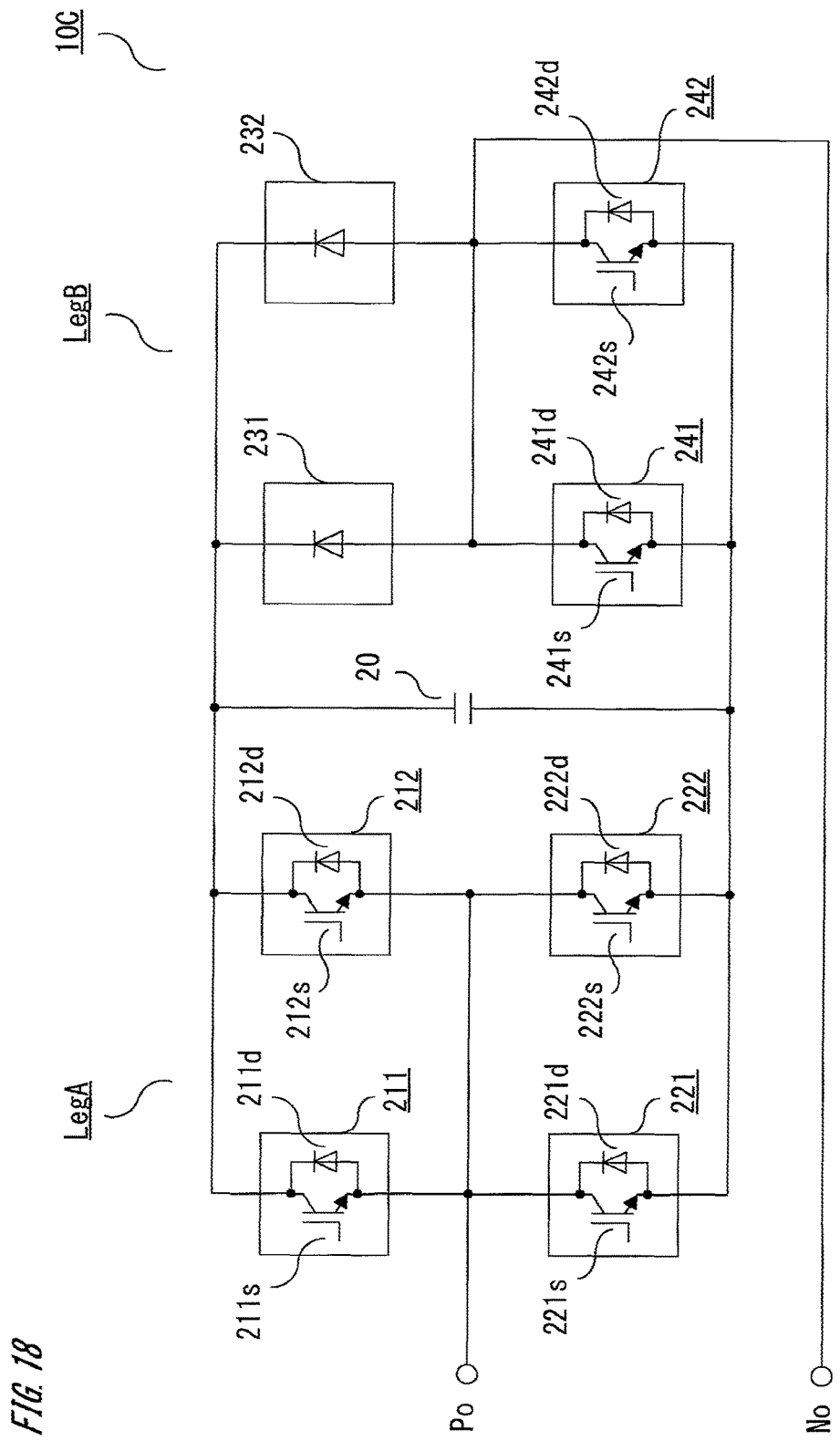
FIG. 18 is a circuit diagram showing the configuration of a first converter cell according to embodiment 4 of the present invention.

FIG. 18 is a circuit diagram showing the configuration of the first converter cell 10C. The first converter cell 10C is obtained by connecting two semiconductor elements in parallel in each arm of the first converter cell 10A shown in FIG. 2.

As shown in FIG. 18, as in the first converter cell 10A, the first converter cell 10C includes: a Leg A which is a first bridge having upper and lower arms both formed by semiconductor switches; a Leg B which is a second bridge having an upper arm formed by only diodes and a lower arm formed by semiconductor switches; and a capacitor 20, and forms a full-bridge circuit in which the Leg A and the Leg B are connected in parallel to the capacitor 20. A positive cell output terminal Po is connected to each connection point between the semiconductor switches, which is the middle point in the Leg A, and a negative cell output terminal No is connected to each connection point between the diodes and the semiconductor switches, which is the middle point in the Leg B.

In the first converter cell 10C, the upper arm of the Leg A has semiconductor switches 211, 212 connected in parallel, and the lower arm thereof has semiconductor switches 221, 222 connected in parallel. The upper arm of the Leg B has diodes 231, 232 connected in parallel, and the lower arm thereof has semiconductor switches 241, 242 connected in parallel.

The semiconductor switches 211, 212, 221, 222, 241, 242 are respectively composed of semiconductor switching elements 211s, 212s, 221s, 222s, 241s, 242s and flyback diodes 211d, 212d, 221d, 222d, 241d, 242d connected in antiparallel thereto.

The control device 2 performs simultaneous ON/OFF control of the semiconductor switching elements connected in parallel, thereby controlling the first converter cell 10C in the same manner as in the first converter cell 10A described in the above embodiment 1.

Figure 19:
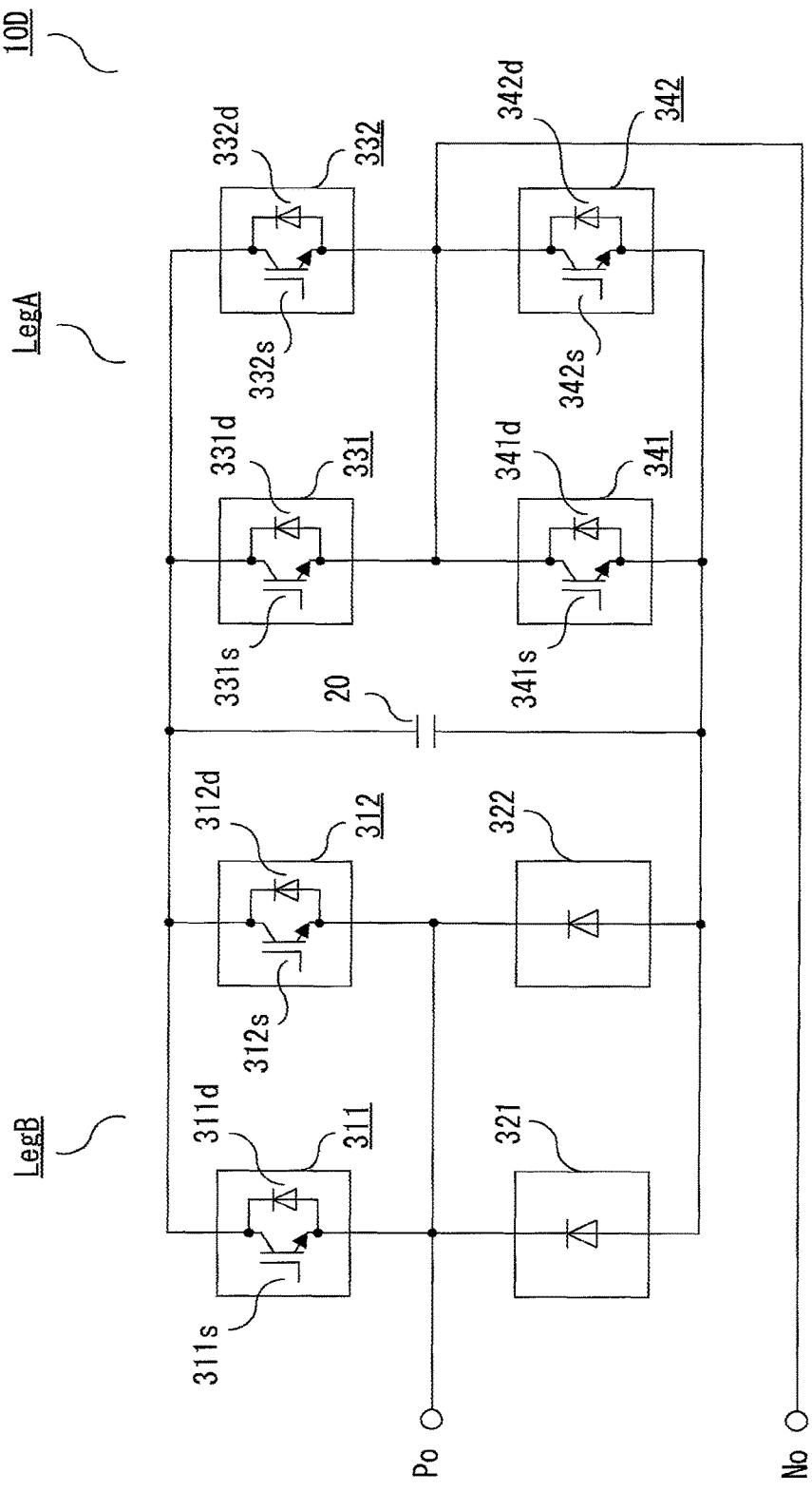
FIG. 19 is a circuit diagram showing the configuration of a first converter cell in another example of embodiment 4 of the present invention.

FIG. 19 is a circuit diagram showing the configuration of a first converter cell 10D. The first converter cell 10D is obtained by connecting two semiconductor elements in parallel in each arm of the first converter cell 10B shown in FIG. 4.

As shown in FIG. 19, as in the first converter cell 10B, the first converter cell 10D includes: a Leg A which is a first bridge having upper and lower arms both formed by semiconductor switches; a Leg B which is a second bridge having an upper arm formed by semiconductor switches and a lower arm formed by only diodes; and a capacitor 20, and forms a full-bridge circuit in which the Leg A and the Leg B are connected in parallel to the capacitor 20. A negative cell output terminal No is connected to each connection point between the semiconductor switches, which is the middle point in the Leg A, and a positive cell output terminal Po is connected to each connection point between the semiconductor switches and the diodes, which is the middle point in the Leg B.

In the first converter cell 10D, the upper arm of the Leg A has semiconductor switches 331, 332 connected in parallel, and the lower arm thereof has semiconductor switches 341, 342 connected in parallel. The upper arm of the Leg B has semiconductor switches 311, 312 connected in parallel, and the lower arm thereof has diodes 321, 322 connected in parallel.

The semiconductor switches 311, 312, 331, 332, 341, 342 are respectively composed of semiconductor switching elements 311s, 312s, 331s, 332s, 341s, 342s and flyback diodes 311d, 312d, 331d, 332d, 341d, 342d connected in antiparallel thereto.

The control device 2 performs simultaneous ON/OFF control of the semiconductor switching elements connected in parallel, thereby controlling the first converter cell 10D in the same manner as in the first converter cell 10B described in the above embodiment 1.

As the semiconductor switching elements in the first converter cells 10C, 10D, self-turn-off semiconductor switching elements such as IGBT, GCT, or MOSFET are used. If diodes (body diodes) are included in the semiconductor switching elements, the flyback diodes may be omitted.

As described above, the first converter cells 10C, 10D are configured such that two semiconductor elements are connected in parallel in each arm, and the semiconductor switching elements connected in parallel are simultaneously controlled to be ON/OFF, whereby the current capacity can be increased.

As described above, in the diode used in the Leg B of the first converter cell 10, current flows only during a comparatively short time in the protection mode. Therefore, in the first converter cell 10C (10D), even if the diodes 231, 232 (321, 322) connected in parallel in the Leg B are replaced with one element, increase in heat generation and loss can be almost ignored.

Figure 20:
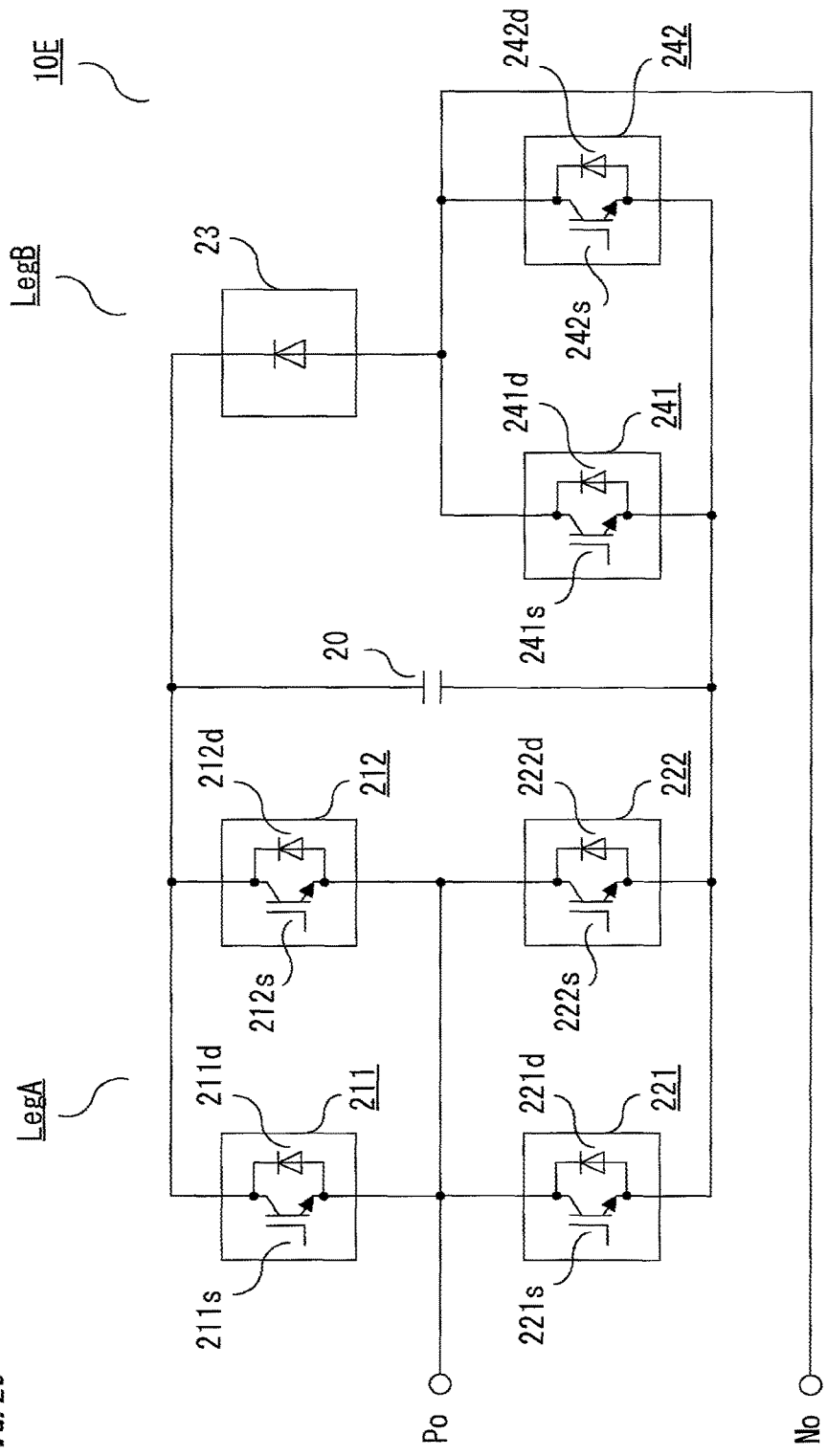
FIG. 20 is a circuit diagram showing the configuration of a first converter cell in another example of embodiment 4 of the present invention.
Figure 21:
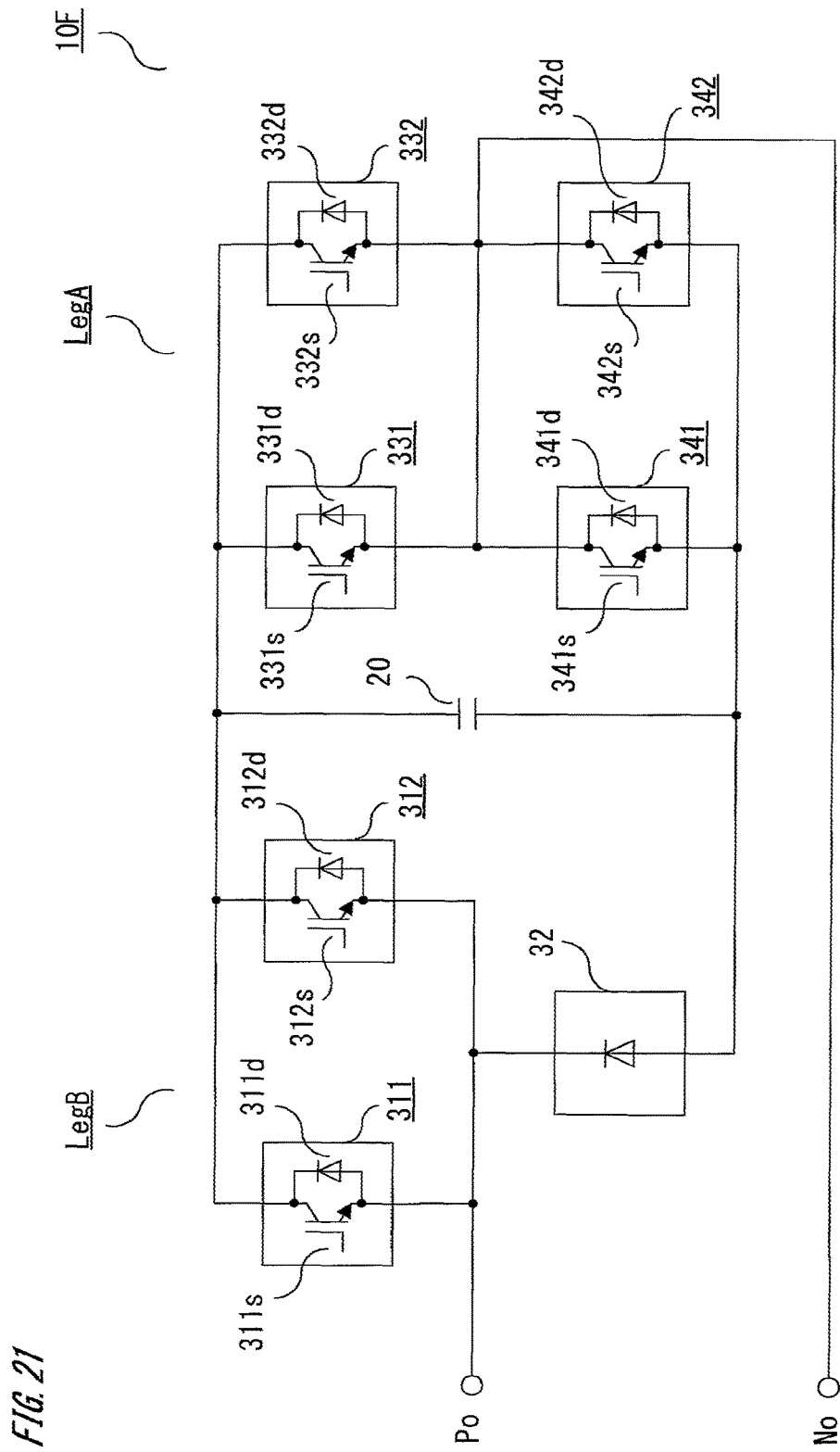
FIG. 21 is a circuit diagram showing the configuration of a first converter cell in another example of embodiment 4 of the present invention.

A first converter cell 10E shown in FIG. 20 is obtained by replacing the diodes 231, 232 connected in parallel in the first converter cell 10C shown in FIG. 18, with one diode 23. A first converter cell 10F shown in FIG. 21 is obtained by replacing the diodes 321, 322 connected in parallel in the first converter cell 10D shown in FIG. 19, with one diode 32.

Thus, by using one diode 23 (32), the current capacities of the first converter cells 10E, 10F can be increased, and the number of elements therein can be decreased, leading to size reduction.

As described above, in the steady mode, the semiconductor switching element of the Leg B of the first converter cell 10 is controlled to be fixed in an ON state. Therefore, in the first converter cell 10E (10F), switching loss in the semiconductor switching elements 241s, 242s (311s, 312s) in the Leg B is smaller than that in the semiconductor switching elements in the Leg A. Therefore, in the first converter cell 10E (10F), the semiconductor switches 241, 242 (311, 312) connected in parallel in the Leg B can be replaced with one element.

Figure 22:
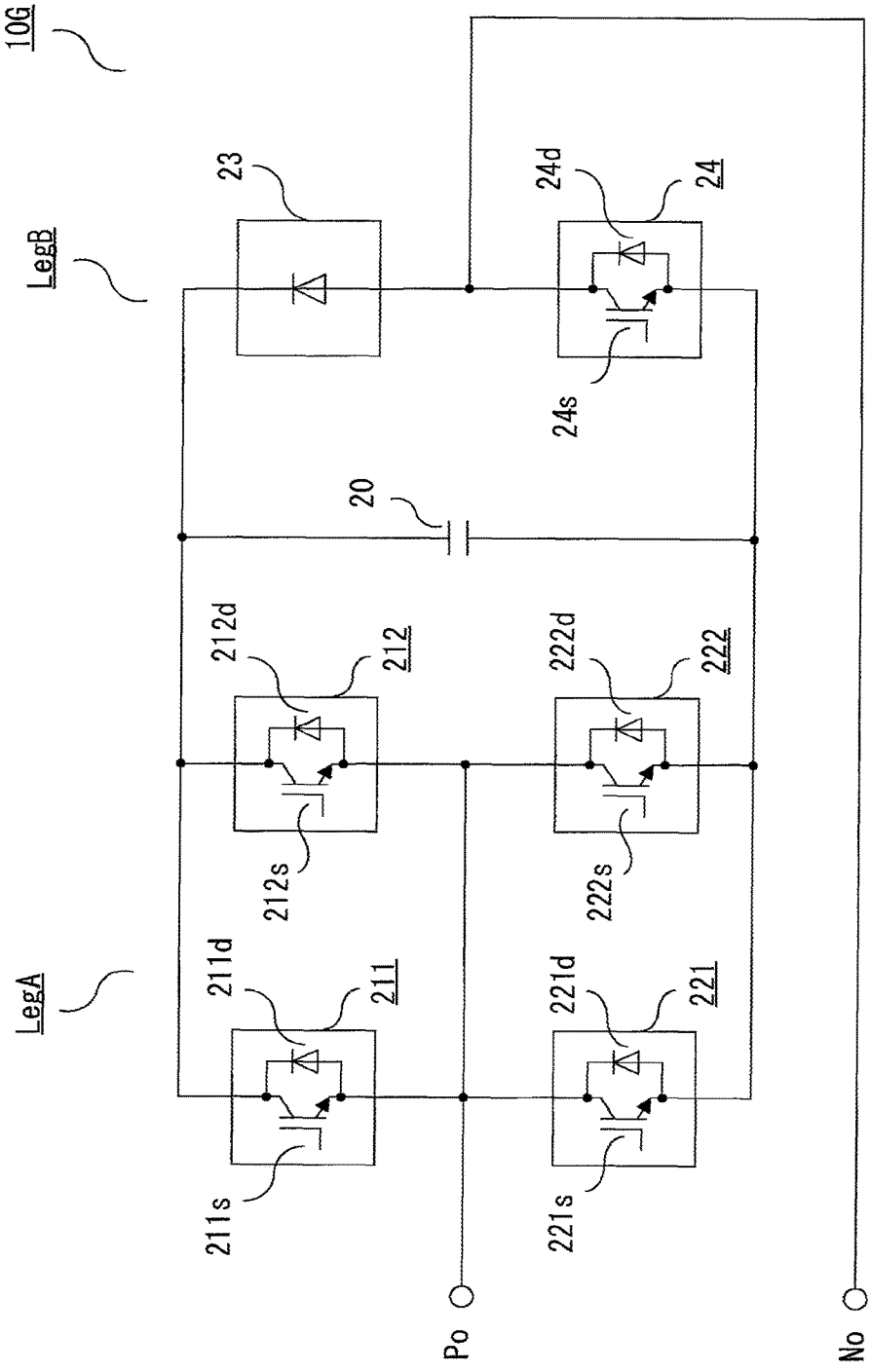
FIG. 22 is a circuit diagram showing the configuration of a first converter cell in another example of embodiment 4 of the present invention.
Figure 23:
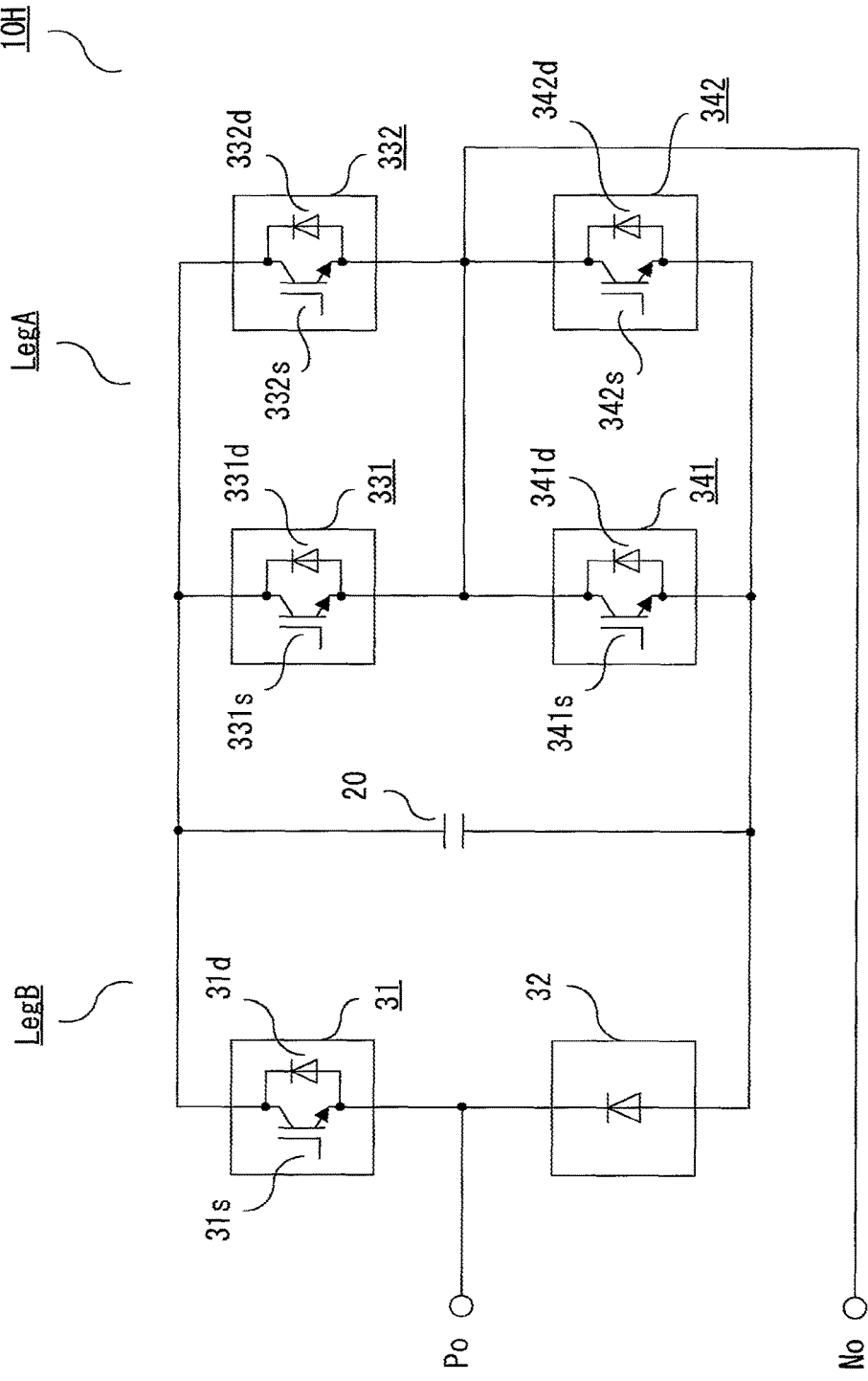
FIG. 23 is a circuit diagram showing the configuration of a first converter cell in another example of embodiment 4 of the present invention.

A first converter cell 10G shown in FIG. 22 is obtained by replacing the semiconductor switches 241, 242 connected in parallel in the first converter cell 10E shown in FIG. 20, with one semiconductor switch 24. A first converter cell 10H shown in FIG. 23 is obtained by replacing the semiconductor switches 311, 312 connected in parallel in the first converter cell 10F shown in FIG. 21, with one semiconductor switch 31.

In this case, the Leg A has a two-element parallel configuration in both of the upper and lower arms, and the Leg B has a one-element non-parallel configuration in both of the upper and lower arms. Thus, the current capacities of the first converter cells 10G, 10H can be increased, and the number of elements therein can be decreased, leading to size reduction.

Next, two kinds of configurations (second converter cells 15C, 15D) of the second converter cell 15 will be described below, with reference to FIG. 24. A second converter cell 15C shown in FIG. 24(a) is obtained by connecting two semiconductor switches in parallel in each arm of the second converter cell 15A shown in FIG. 6(a). A second converter cell 15D shown in FIG. 24(b) is obtained by connecting two semiconductor switches in parallel in each arm of the second converter cell 15B shown in FIG. 6(b).

As shown in FIG. 24(a), the second converter cell 15C includes: a Leg Aa which is a first bridge having upper and lower arms both formed by semiconductor switches; and a capacitor 40, and forms a half-bridge circuit in which the Leg Aa is connected in parallel to the capacitor 40. A positive cell output terminal Po is connected to each connection point between the semiconductor switches, which is the middle point in the Leg Aa, and a negative cell output terminal No is connected to each connection point between the capacitor 40 and the semiconductor switches.

In the second converter cell 15C, the upper arm of the Leg Aa has semiconductor switches 411, 412 connected in parallel, and the lower arm thereof has semiconductor switches 421, 422 connected in parallel.

As shown in FIG. 24(b), the second converter cell 15D includes: a Leg Aa which is a first bridge having upper and lower arms both formed by semiconductor switches; and a capacitor 40, and forms a half-bridge circuit in which the Leg Aa is connected in parallel to the capacitor 40. A negative cell output terminal No is connected to each connection point between the semiconductor switches, which is the middle point in the Leg Aa, and a positive cell output terminal Po is connected to each connection point between the capacitor 40 and the semiconductor switches.

In the second converter cell 15D, the upper arm of the Leg Aa has semiconductor switches 511, 512 connected in parallel, and the lower arm thereof has semiconductor switches 521, 522 connected in parallel.

In the second converter cell 15C (15D), the semiconductor switches 411, 412, 421, 422 (511, 512, 521, 522) are respectively composed of semiconductor switching elements 411s, 412s, 421s, 422s (511s, 512s, 521s, 522s) and flyback diodes 411d, 412d, 421d, 422d (511d, 512d, 521d, 522d) connected in antiparallel thereto.

As the semiconductor switching elements in the first converter cells 15C, 15D, self-turn-off semiconductor switching elements such as IGBT, GCT, or MOSFET are used. If diodes (body diodes) are included in the semiconductor switching elements, the flyback diodes may be omitted.

The control device 2 performs simultaneous ON/OFF control of the semiconductor switching elements connected in parallel, thereby controlling the second converter cell 15C (15D) in the same manner as in the second converter cell 15A (15B) shown in the above embodiment 1.

Thus, the second converter cells 15C, 15D are configured such that two semiconductor elements are connected in parallel in each arm, and the semiconductor switching elements connected in parallel are simultaneously controlled to be ON/OFF, whereby the current capacity can be increased.

As described above, in the present embodiment 4, the number of the semiconductor elements (semiconductor switching element, diodes) in each of the Leg A, the Leg B, and the Leg Aa of the first converter cell 10 and the second converter cell 15 is increased, and the semiconductor elements in each leg are connected in parallel, whereby an electric power conversion device adapted to usage for large current capacity can be achieved.

Regarding the parallel connection, the case where two elements are connected in parallel has been shown, but three or more elements may be connected in parallel. Also in this case, the number of diodes connected in parallel in the Leg B of the first converter cell 10 can be set to be not greater than the number of semiconductor switching elements connected in parallel in each arm in the Leg A and the Leg B, and the number of semiconductor switching elements connected in parallel in the Leg B of the first converter cell 10 can be set to be not greater than the number of semiconductor switching elements connected in parallel in each arm in the Leg A. By effectively decreasing the number of elements as described above, the electric power conversion device adapted to usage for large current capacity can be efficiently downsized.

In the above embodiments, a gate drive circuit is provided to each semiconductor switching element in the power converters 1, 1a to 1d, and each gate drive circuit drives the semiconductor switching element on the basis of the control signal 2a, 12a from the control device 2, 12.

Figure 25:
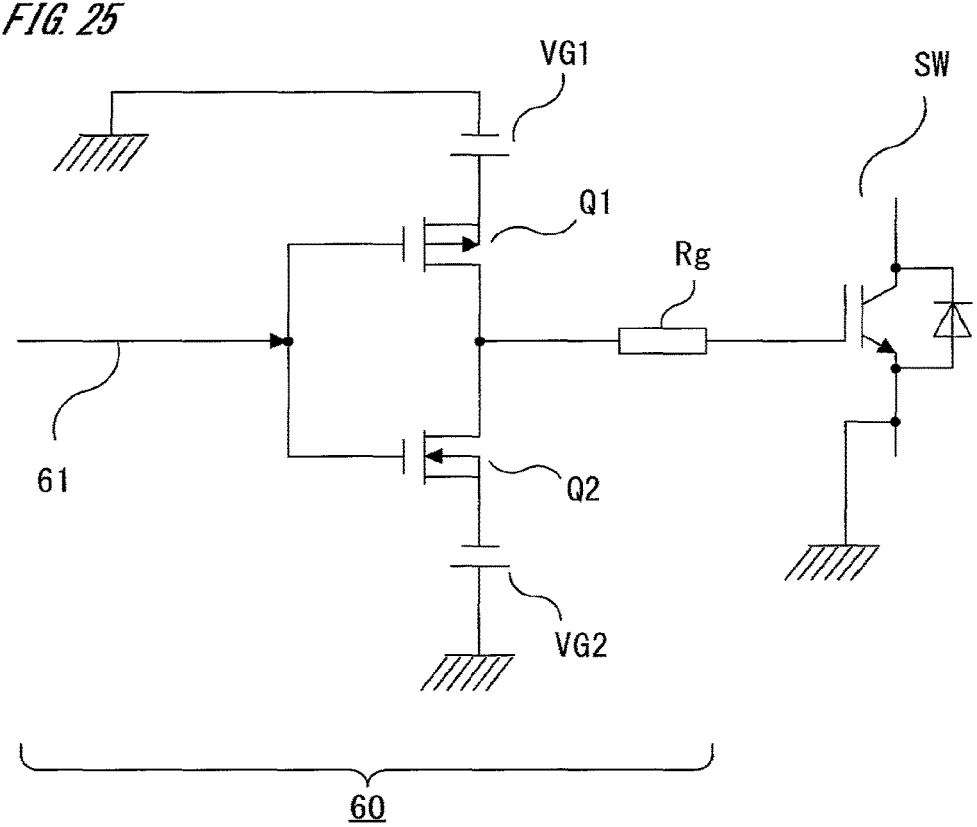
FIG. 25 is a circuit diagram showing the configuration of a gate drive circuit according to embodiment 4 of the present invention.

FIG. 25 is a circuit diagram showing a configuration example of a gate drive circuit 60 for driving a semiconductor switching element SW.

As shown in FIG. 25, the gate drive circuit 60 includes: a gate resistance Rg having an end connected to the gate terminal of the semiconductor switching element SW; a switch Q1 for controlling the turning-on of the semiconductor switching element SW; and a switch Q2 for controlling the turning-off of the semiconductor switching element SW. Further, the gate drive circuit 60 includes: a DC voltage source VG1 which applies positive gate bias voltage to the gate terminal of the semiconductor switching element SW; and a DC voltage source VG2 which applies negative gate bias voltage thereto. In addition, an input signal 61 generated from the control signal 2a, 12a which is a switching command signal is given to the gate drive circuit 60.

It is noted that the reference potential of the gate drive circuit 60 is equal to the potential of the emitter terminal of the semiconductor switching element SW. As the switches Q1, Q2, for example, self-turn-off semiconductor switching elements such as MOSFET are used.

To turn on the semiconductor switching element SW, the switch Q1 is turned on by an input signal 61, and gate current flows from the DC voltage source VG1 via the gate resistance Rg to the gate terminal of the semiconductor switching element SW, thereby charging the gate terminal. To turn off the semiconductor switching element SW, the switch Q2 is turned on by an input signal 61, and the gate terminal of the semiconductor switching element SW is discharged via the gate resistance Rg.

In the gate drive circuit 60 in the Leg B of the first converter cell 10, the gate resistance value Rg (value of gate resistance Rg) can be set to be greater than those in the gate drive circuits 60 in the Leg A and the Leg Aa of the first and second converter cells 10, 15.

If the gate resistance value Rg of the gate drive circuit 60 becomes greater, the switching speed of the semiconductor switching element is slowed, so that surge voltage when current is interrupted (at the time of turning off) can be suppressed, while switching loss per one switching increases. The semiconductor switching element in the Leg B does not perform switching in the steady mode. Therefore, even if the gate resistance value Rg is increased, surge voltage can be suppressed without increasing switching loss. Therefore, even if the number of the semiconductor switching elements connected in parallel in the Leg B of the first converter cell 10 is decreased, a great current-interruption capability can be obtained.

Wide bandgap semiconductors may be used as material for all or some of the semiconductor elements (semiconductor switching elements, diodes) in the first and second converter cells 10, 15. Silicon is often used as material for the semiconductor elements. Examples of materials for wide bandgap semiconductors include silicon carbide, a gallium-nitride-based material, and diamond.

By using wide bandgap semiconductors, the withstand voltage of the semiconductor elements can be enhanced, and therefore the number of the converter cells connected in series can be decreased. Further, wide bandgap semiconductors can reduce switching loss.

Therefore, for example, wide bandgap semiconductors may be used for only the semiconductor switching elements that perform switching operations in a steady state, and the flyback diodes connected in antiparallel thereto.

In addition, by increasing the chip area of a wide bandgap semiconductor, conduction loss can be reduced. Using this, conduction loss can be reduced by using wide bandgap semiconductors for only the semiconductor switching elements that are always turned on in a steady state.

If wide bandgap semiconductors are used for all the semiconductor elements, both of the aforementioned effects can be obtained.

Embodiment 5

The electric power conversion devices 100, 100a described in the above embodiments 1 to 4 are each configured from one electric power conversion device. However, a plurality of the same electric power conversion devices may be provided, and connected to each other on the DC side.

Figure 26:
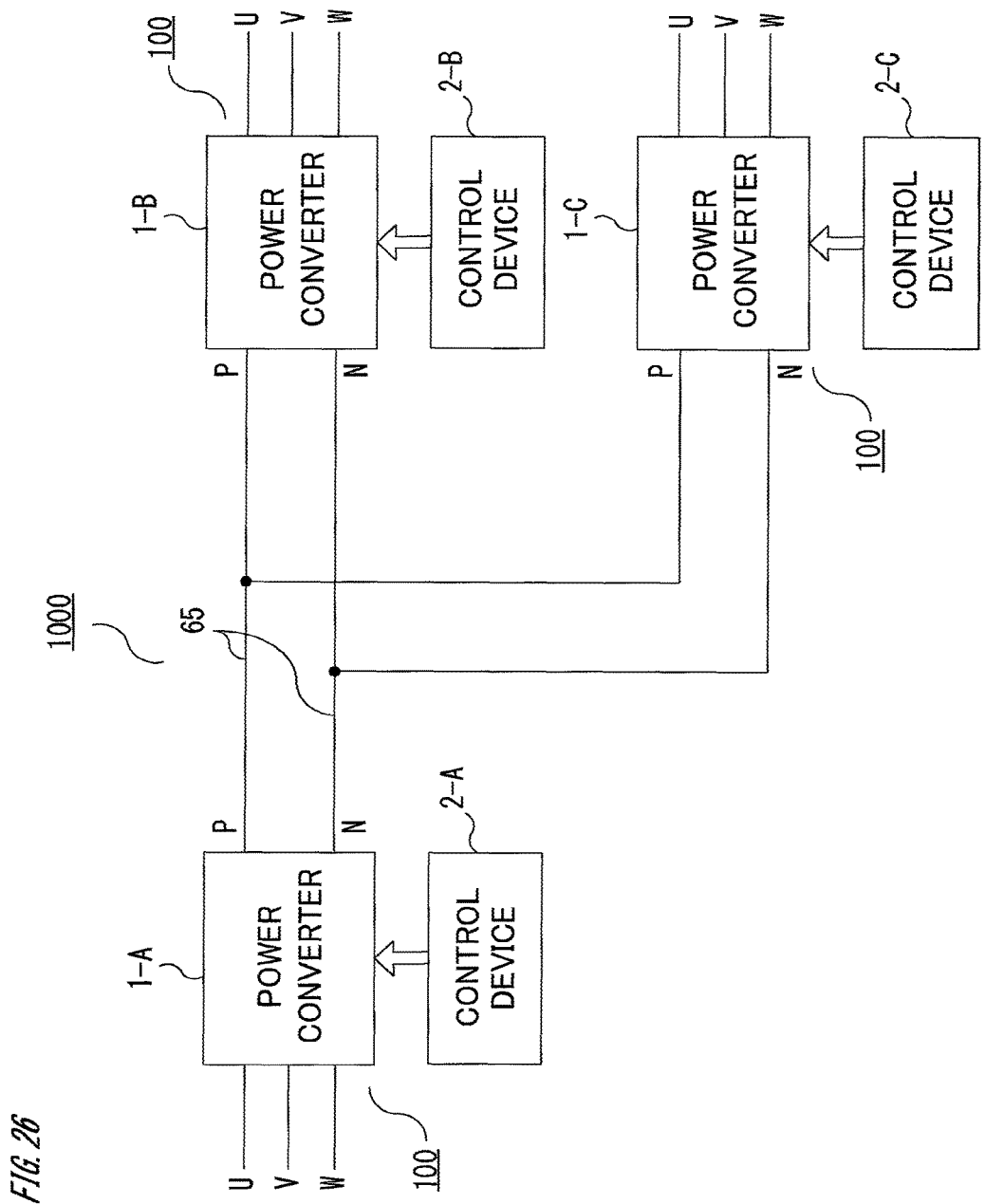
FIG. 26 is a diagram showing the connection configuration of an electric power conversion device according to embodiment 5 of the present invention.

In the present embodiment 5, an electric power conversion device 1000 configured by a device group including a plurality of electric power conversion devices, will be described. As shown in FIG. 26, the electric power conversion device 1000 configured by a device group includes, for example, three of the same devices as the electric power conversion device 100 of the above embodiment 1. That is, the electric power conversion device 1000 includes: three power converters 1-A, 1-B, 1-C; and three control devices 2-A, 2-B, 2-C for respectively controlling the power converters 1-A, 1-B, 1-C. The DC terminals P, N of the three power converters 1-A, 1-B, 1-C are connected to each other via DC lines 65.

The three power converters 1-A, 1-B, 1-C are controlled by the respective control devices 2-A, 2-B, 2-C in the same manner as in the above embodiment 1.

For example, when the control device 2-A detects that short-circuit occurs between the DC terminals P, N of the power converter 1-A, the control device 2-A operates the power converter 1-A in the protection mode. In addition, the power converters 1-B, 1-C which are far from the short-circuit point are also operated in the protection mode in the same manner. Thereafter, open/close devices (not shown) connected at positions between which the short-circuit point is present are opened, whereby the failure can be eliminated.

Thus, as in the above embodiment 1, the power converter 1-A can suppress overcurrent (short-circuit current ia) occurring due to short-circuit between the DC terminals P, N, and also, reactive power can be outputted to the AC terminals U, V, W even when short-circuit occurs. Therefore, it is possible to continue operation with high reliability without adversely influencing the AC side. Further, since the failure is eliminated by the open/close devices, adverse influence on the other two power converters 1-B, 1-C is suppressed, and the two power converters 1-B, 1-C keep the mutual connection state and thus can restart operations in the steady mode.

Such an electric power conversion device 1000 can be applied to systems for power generation, power transmission and distribution, and the like, in which DC power having further high voltage is used, by combining DC-side outputs of the plurality of power converters 1-A, 1-B, 1-C.

It is noted that, within the scope of the present invention, the above embodiments may be freely combined with each other, or each of the above embodiments may be modified or simplified as appropriate.

The invention claimed is:

1. An electric power conversion device comprising: a power converter including a plurality of leg circuits connected in parallel between positive and negative DC terminals, each leg circuit including a first arm and a second arm connected in series and being connected to an AC line for each phase, the first arm and the second arm each being composed of at least one converter cell connected in series, the power converter performing power conversion between multiphase AC and DC; and a control device for generating respective voltage commands for the first arm and the second arm of each lea circuit, to perform output control of each converter cell in the first arm and the second arm, thereby controlling the power converter, wherein each of the at least one converter cell in the first arm of each leg circuit of the power converter is a first converter cell having a full-bridge configuration including an energy storing element, a first bridge having upper and lower arms both having semiconductor switching element, and a second bridge having upper and lower arms one of which has a semiconductor switching element and the other of which has only a diode, each of the at least one converter cell in the second arm of each leg circuit of the power converter is a second converter cell having a half-bridge configuration including an energy storing element and a first bridge having upper and lower arms both having semiconductor switching elements, the control device has two control modes of a steady mode and a protection mode, and when short-circuit between the DC terminals is detected, the control device switches from the steady mode to the protection mode, to turn off all the semiconductor switching elements in each converter cell of the first arm of each leg circuit, and perform output control of each converter cell of the second arm of each leg circuit so as to perform reactive power compensation operation, wherein each of the first and second converter cells includes gate drive circuits for driving the corresponding semiconductor switching elements, and the gate drive circuit in the second bridge of each first converter cell has a greater gate resistance value than those of the gate drive circuits in the first bridges of the first and second converter cells.

2. The electric power conversion device according to claim 1, wherein all the converter cells in the first arm of each leg circuit are the first converter cells, and all the converter cells in the second arm of each leg circuit are the second converter cells.

3. The electric power conversion device according to claim 1, wherein in the steady mode, the control device performs switching control for the semiconductor switching elements in the first bridges of the first and second converter cells on the basis of the voltage commands generated for the first arm and the second arm of each leg circuit, and controls the semiconductor switching element in the second bridge of each first converter cell to be fixed in an ON state.

4. The electric power conversion device according to claim 1, wherein in the protection mode, the control device controls the reactive power compensation operation, using a voltage command on which common DC voltage is superimposed among all phases.

5. The electric power conversion device according to claim 1, wherein each of the upper and lower arms of the first bridge in each first converter cell includes a plurality of the semiconductor switching elements connected in parallel, one of the upper and lower arms of the second bridge in each first converter cell includes one or a plurality of semiconductor switching elements connected in parallel, and the other one thereof includes one or a plurality of diodes connected in parallel, and a number of the semiconductor switching elements connected in parallel in the second bridge is not less than a number of the diodes connected in parallel, and not greater than a number of the semiconductor switching elements connected in parallel of the upper arm in the first bridge or a number of the semiconductor switching elements connected in parallel of the lower arm in the first bridge, whichever is lesser.

6. The electric power conversion device according to claim 1, comprising: a plurality of the power converters; and a plurality of the control devices for respectively controlling the power converters, wherein the DC terminals of the plurality of power converters are connected to each other.

7. The electric power conversion device according to claim 1, wherein each connection point between the first arm and the second arm is connected to an AC terminal for each phase.

8. The electric power conversion device according to claim 1, wherein one of the DC terminals is connected to an open close portion, and in the protection mode, the control device turns off all the semiconductor switching elements in each converter cell of the first arm, and thereafter, operates the open/close portion into an opened state.

9. The electric power conversion device according to claim 8, wherein in the protection mode, the control device operates the open/close portion into an opened state, and thereafter, performs output control of each converter cell of the first arm so as to perform reactive power compensation operation.

10. The electric power conversion device according to claim 8, wherein the open/close portion is capable of interrupting current smaller than twice rated DC current of the power converter.

11. The electric power conversion device according to claim 1, wherein the control device has, in addition to the two control modes, a standby mode for turning off all the semiconductor switching elements in each converter cell of the first arm and the second arm of each leg circuit, and when short-circuit between the DC terminals is detected, the control device switches to the standby mode prior to switching from the steady mode to the protection mode.

12. The electric power conversion device according to claim 11, wherein when short-circuit between the DC terminals is detected, the control device switches from the steady mode to the standby mode, and after a set standby period elapses, switches to the protection mode.

13. The electric power conversion device according to claim 11, wherein when short-circuit between the DC terminals is detected, the control device switches from the steady mode to the standby mode, and in accordance with an operation command given from outside, switches to the protection mode.

14. The electric power conversion device according to claim 11, wherein all the converter cells in the first arm of each leg circuit are the first converter cells, and all the converter cells in the second arm of each leg circuit are the second converter cells.

15. The electric power conversion device according to claim 11, wherein in the steady mode, the control device performs switching control for the semiconductor switching elements in the first bridges of the first and second converter cells on the basis of the voltage commands generated for the first arm and the second arm of each leg circuit, and controls the semiconductor switching element in the second bridge of each first converter cell to be fixed in an ON state.

16. The electric power conversion device according to claim 11, wherein one of the DC terminals is connected to an open/close portion, and in the protection mode, the control device turns off all the semiconductor switching elements in each converter cell of the first arm, and thereafter, operates the open/close portion into an opened state.

17. The electric power conversion device according to claim 11, wherein in the protection mode, the control device controls the reactive power compensation operation, using a voltage command on which common DC voltage is superimposed among all phases.

18. The electric power conversion device according to claim 11, wherein each of the upper and lower arms of the first bridge in each first converter cell includes a plurality of the semiconductor switching elements connected in parallel, one of the upper and lower arms of the second bridge in each first converter cell includes one or a plurality of semiconductor switching elements connected in parallel, and the other one thereof includes one or a plurality of diodes connected in parallel, and a number of the semiconductor switching elements connected in parallel in the second bridge is not fess than a number of the diodes connected in parallel and not greater than a number of the semiconductor switching elements connected in parallel of the upper arm in the first bridge or a number of the semiconductor switching elements connected in parallel of the lower arm in the first bridge, whichever is lesser.

* * * * *